United States Patent
Inoue et al.

(10) Patent No.: US 9,154,823 B2
(45) Date of Patent: Oct. 6, 2015

(54) ADVERTISEMENT SELECTING APPARATUS, ADVERTISEMENT SELECTING METHOD AND STORAGE MEDIUM

(75) Inventors: Toshio Inoue, Tokyo (JP); Tomohiro Tsunoda, Tokyo (JP); Masaaki Hoshino, Tokyo (JP); Tomoharu Ohsumi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 2249 days.

(21) Appl. No.: 10/343,872

(22) PCT Filed: Jun. 6, 2002

(86) PCT No.: PCT/JP02/05622
§ 371 (c)(1),
(2), (4) Date: Oct. 8, 2003

(87) PCT Pub. No.: WO02/101587
PCT Pub. Date: Dec. 19, 2002

(65) Prior Publication Data
US 2004/0054577 A1    Mar. 18, 2004

(30) Foreign Application Priority Data

Jun. 6, 2001 (JP) .................. 2001-171319
Jun. 6, 2001 (JP) .................. 2001-171321

(51) Int. Cl.
*G06Q 30/02* (2012.01)
*H04N 21/262* (2011.01)
(Continued)

(52) U.S. Cl.
CPC ......... *H04N 21/26233* (2013.01); *G06Q 30/02* (2013.01); *G06Q 30/0258* (2013.01); *G06Q 30/0272* (2013.01); *H04N 7/165* (2013.01);
(Continued)

(58) Field of Classification Search
USPC ..................... 705/14, 14.41, 43, 52
See application file for complete search history.

(56) References Cited

U.S. PATENT DOCUMENTS 5,754,939 A  *  5/1998  Herz et al. .................. 455/3.04
5,774,170 A  *  6/1998  Hite et al. ....................... 725/34
(Continued)

FOREIGN PATENT DOCUMENTS

EP    1 045 322    10/2000
JP    7 325850    12/1995
(Continued)

*Primary Examiner* — John Van Bramer
(74) *Attorney, Agent, or Firm* — Frommer Lawrence & Haug LLP; William S. Frommer; Ellen Marcie Emas

(57) ABSTRACT

An advertisement selecting system is disclosed providing, when selecting advertisements to be exposed to subscribers over the Internet, exposure control reflecting the inventory of advertisements by taking into account results of past exposure of each of the advertisements. When subscribers with a particular profile biased to specific tastes or preferences gain access to contents carrying advertisements, the first-ranked advertisement, i.e., the one best targeted for the subscribers in question, is exposed repeatedly but in a manner also making way for the advertisements in second and subsequent places which would be less likely to be exposed if handled conventionally, so that the stocked advertisements are exposed in fairly averaged fashion. Advertisement exposure is thus controlled in a manner averting lopsided exposure of certain (or partial) advertisement information by giving consideration to the advertisement inventory.

19 Claims, 21 Drawing Sheets

(51) Int. Cl.
*H04N 7/16* (2011.01)
*H04N 21/258* (2011.01)
*H04N 21/2668* (2011.01)
*H04N 21/81* (2011.01)
*H04N 21/84* (2011.01)

(52) U.S. Cl.
CPC ... *H04N 21/25866* (2013.01); *H04N 21/25883* (2013.01); *H04N 21/25891* (2013.01); *H04N 21/2668* (2013.01); *H04N 21/812* (2013.01); *H04N 21/84* (2013.01)

(56) References Cited

U.S. PATENT DOCUMENTS

| | | | |
|---|---|---|---|
| 5,848,396 A * | 12/1998 | Gerace | 705/7.33 |
| 5,901,287 A * | 5/1999 | Bull et al. | 709/218 |
| 6,134,532 A * | 10/2000 | Lazarus et al. | 705/14.25 |
| 6,216,129 B1 * | 4/2001 | Eldering | 705/36 R |
| 6,327,574 B1 * | 12/2001 | Kramer et al. | 705/14.66 |
| 6,385,592 B1 * | 5/2002 | Angles et al. | 705/14.56 |
| 6,591,248 B1 * | 7/2003 | Nakamura et al. | 705/14.52 |
| 2001/0001854 A1 * | 5/2001 | Schena et al. | 705/27 |
| 2002/0100062 A1 * | 7/2002 | Lowthert et al. | 725/136 |

FOREIGN PATENT DOCUMENTS

| | | |
|---|---|---|
| JP | 9 163351 | 6/1997 |
| JP | 11 338809 | 12/1999 |
| JP | 2000 163477 | 6/2000 |
| JP | 2000-357173 | 12/2000 |
| JP | 2001-142826 | 5/2001 |

* cited by examiner

CHILDREN

-1.0　　　　　　　　　　　　　　　　1.0
DON'T WANT TO　　DON'T　　WANT TO WATCH
WATCH CHILD-　　　CARE　　CHILD-ORIENTED
ORIENTED　　　　　　　　　　ADVERTISEMENTS
ADVERTISEMENTS

MANUFACTURER A

CHILDREN

WORLD HERITAGE
(CONTENT NAME)

F I G. 1 1
CHILDREN
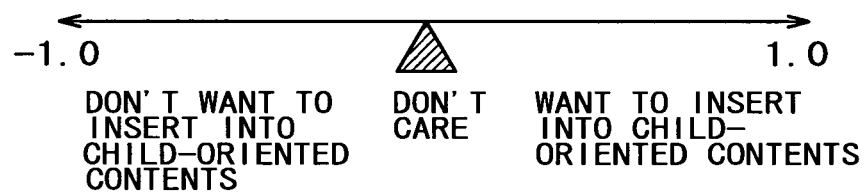
-1.0   　　　　　　　　　　　　　　　1.0
DON'T WANT TO    DON'T    WANT TO INSERT
INSERT INTO      CARE     INTO CHILD-
CHILD-ORIENTED            ORIENTED CONTENTS
CONTENTS
F I G. 1 2
CHILDREN
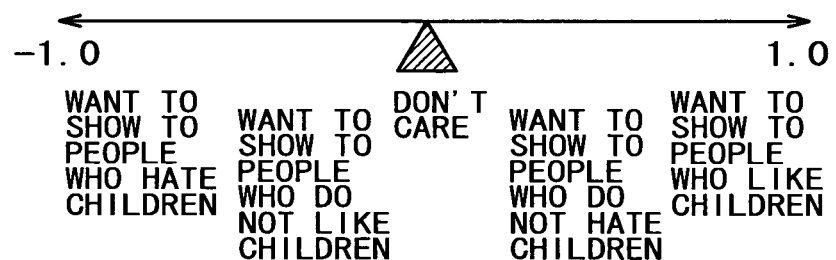
-1.0                                                                1.0
WANT TO      WANT TO    DON'T    WANT TO      WANT TO
SHOW TO      SHOW TO    CARE     SHOW TO      SHOW TO
PEOPLE       PEOPLE              PEOPLE       PEOPLE
WHO HATE     WHO DO              WHO DO       WHO LIKE
CHILDREN     NOT LIKE            NOT HATE     CHILDREN
             CHILDREN            CHILDREN F I G. 1 3
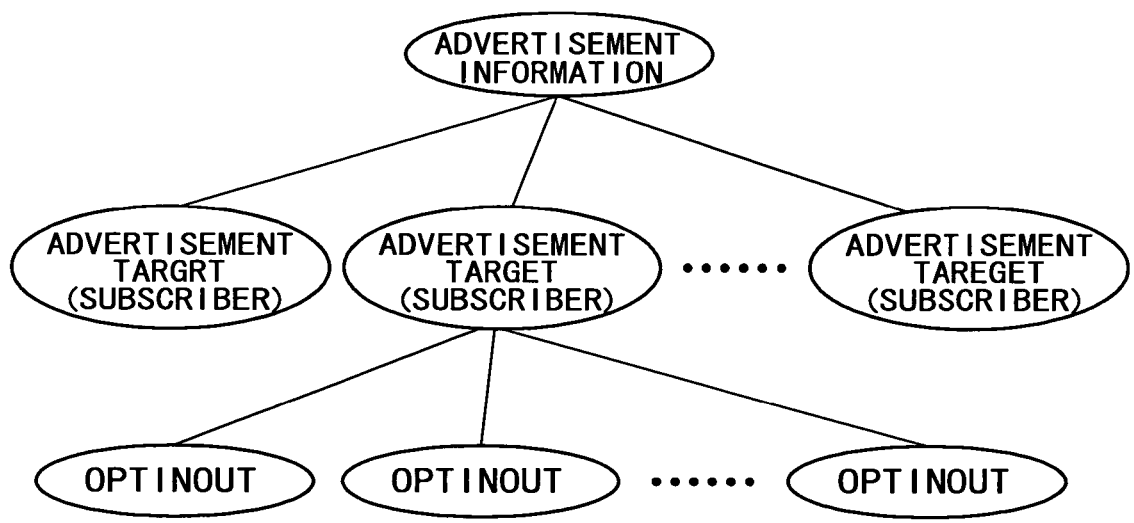
F I G. 1 4
CHILDREN
0    CHILD-ORIENTED    1.0
     CONTENTS F I G. 1 8
TENDENCY TO LOVE CHILDREN
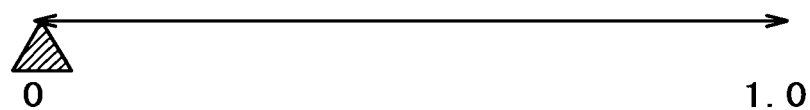
0                                          1.0
F I G. 1 9
TENDENCY TO HATE CHILDREN
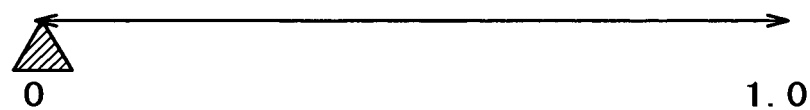
0                                          1.0

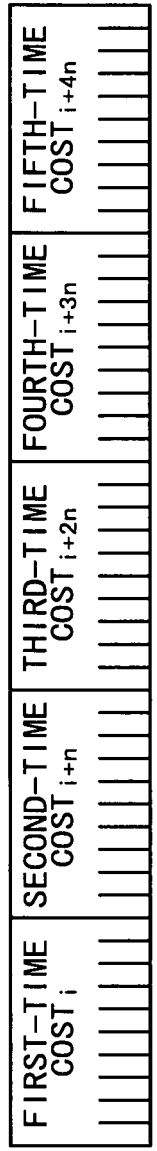

FIG. 26

| FIRST-TIME $COST_i$ | SECOND-TIME $COST_{i+n}$ | THIRD-TIME $COST_{i+2n}$ | FOURTH-TIME $COST_{i+3n}$ | FIFTH-TIME $COST_{i+4n}$ |
|---|---|---|---|---|

THE SCORE (COST) FOR THE SAME ADVERTISEMENT INFORMATION IS GRADUALLY DECREASED FROM THE SECOND TIME ON.

$COST_{i+n} = COST_i \times repeatWeight$
$COST_{i+2n} = COST_{i+n} \times repeatWeight$
$COST_{i+3n} = COST_{i+2n} \times repeatWeight$
$COST_{i+4n} = COST_{i+3n} \times repeatWeight$

FIG. 27
|   | FIRST-TIME CANDIDATE | SECOND-TIME CANDIDATE | THIRD-TIME CANDIDATE | |
|---|---|---|---|---|
| $x_{i0}=$ | 1, 1, 0, 0, 0, | 0, 0, 0, 0, 0, | . . . . . . | |
| $x_{i1}=$ | 0, 0, 0, 0, 1, | 1, 0, 0, 0, 0, | . . . . . . | |
| $x_{i2}=$ | 0, 0, 0, 0, 0, | 0, 1, 0, 0, 0, | . . . . . . | |
FIG. 28
FIG. 29
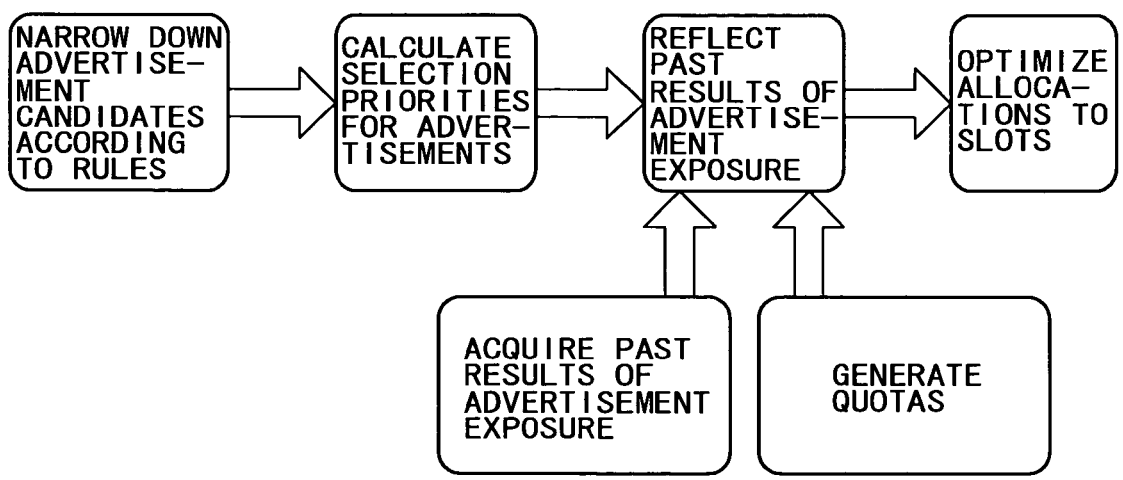

F I G. 3 4
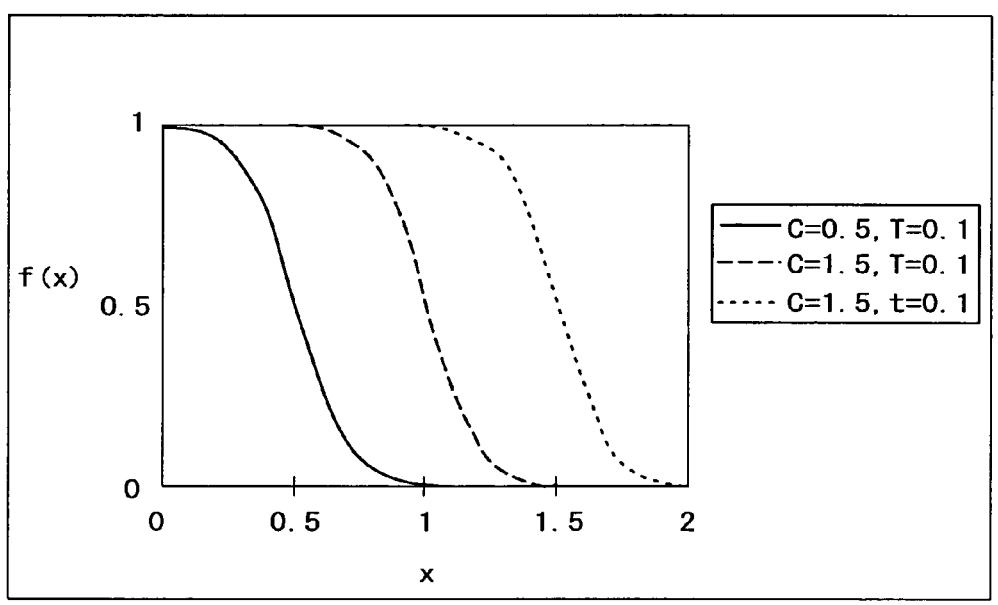

ADVERTISEMENT SELECTING APPARATUS, ADVERTISEMENT SELECTING METHOD AND STORAGE MEDIUM

TECHNICAL FIELD

The present invention relates to an advertisement selecting apparatus, an advertisement selecting method, and a storage medium for properly selecting advertisements to be inserted into contents. More particularly, the invention relates to an advertisement selecting apparatus, an advertisement selecting method, and a storage medium for suitably selecting advertisements to be inserted into contents that are distributed over a wide-area network such as the Internet.

Even more particularly, this invention relates to an advertisement selecting apparatus, an advertisement selecting method, and a storage medium for selecting, in a manner personalized for each subscriber, advertisement information used in contents that are offered to the subscribers under a so-called pull-type distribution scheme over the Internet or similar networks. Still more particularly, the invention relates to an advertisement selecting apparatus, an advertisement selecting method, and a storage medium for selectively attaching advertisement information to contents in a manner both personalized for each subscriber and better reflecting the interests of the subscribers, commercial sponsors, and content providers.

Yet more particularly, this invention relates to an advertisement selecting apparatus, an advertisement selecting method, and a storage medium for controlling exposure of advertisement information to subscribers in a manner both corresponding to inventories of advertisements and reflecting the past results of advertisement information exposure to the subscribers.

BACKGROUND ART

Contents like images and music have long been distributed by content distribution services over media such as television. Some of these content distribution services are chargeable; others are offered free of charge to subscribers, with advertisement information such as commercials inserted into contents so that advertising or sponsoring fees are obtained from commercial sponsors.

Such advertising or sponsoring fees either make up business income for content providers or cover their expenses for producing contents. The sponsors generally include diverse enterprises and business entities which offer on a chargeable basis household electrical appliances, industrial goods, and other products as well as varieties of services. Having advertisement information such as commercials inserted into contents helps draw more customers to the products and services marketed by commercial sponsors. The advertising campaign allows the sponsors to recoup benefits that will justify their expenditure on the advertisements. Although content subscribers enjoy distributed contents apparently free of charge, they may be regarded in fact as paying for the privilege by watching the advertisement information. The advertising businesses have already extended their operations throughout the broadcasting and publishing industries as well as in diverse content distribution services.

Under these circumstances, there exist certain linkages between subscribers, commercial sponsors, and content providers. That is, commercial sponsors get content providers to insert advertisement information prepared to attract subscribers' interest into contents. This promotes consumption of the advertised products and services, boosting the revenues of the commercial sponsors. The sponsors pay the advertising fees, expecting to derive further income and expansion of their business from the expenditure. With their earnings thus increased, the content providers expend more in producing better contents. This advertising business model works on the assumption that advertisement information inserted into contents is actually effective. In other words, attaching ineffective advertisement information to contents yields few benefits for the subscribers, commercial sponsors, or content providers.

Recent innovations and advances in data processing and telecommunication technologies have prompted a significant evolution of content distribution services. Traditionally, the so-called push-type content distribution services such as TV and radio broadcasting were the norm. Lately, by contrast, pull-type content distribution services such as those utilizing wide-area networks including the Internet are gradually gaining widespread acceptance.

Illustratively, over a TCP/IP (Transmission Control Protocol/Internet Protocol) network like the Internet, there exist information-providing spaces exemplified by the WWW (World Wide Web). In such a setup, resource identification information in URL (Uniform Resource Locator) format is used to search through the information-filled space for gaining access to desired information resources described in HTML (Hyper Text Markup Language) format. Information resources of that type are viewed as home pages by the party called clients activating a WWW browser. In that setup, content providers superpose their advertisement information as "banner ads" on the home pages they run to gain advertising revenues.

Today, as network circuits such as telephone lines (asymmetric digital subscriber lines known as ADSL) and cable TV networks are getting faster in data transmission, the business prospects for image content distribution services handling moving pictures such as movies, animation films, and live broadcasts are brightening up.

One promising development is the so-called streaming technology that is starting to gain widespread use. The technology involves allowing a user to playback files even as they are being downloaded, not after completion of the download. Content distribution by streaming is considered to be the key to next-generation Internet usages. At present, well-known content distribution systems implementing the streaming technology include "RealSystem G2" and "Windows Media Technologies."

These image content distribution services are also receptive to the advertising business model. That is, advertisement information is inserted into contents so that it may be distributed at a very low cost or free of charge to far more subscribers than in the case that the contents are chargeable. This can constitute a business that benefits three parties: subscribers, content providers, and commercial sponsors. As mentioned, however, the business presupposes that advertisement information attached to contents is significantly effective.

Pull-type content-providing businesses such as Internet-based content distribution services can personalize or customize advertisement information for each subscriber before inserting the information into contents for distribution to the subscribers.

Generally, advertisement information to be distributed is selected on the basis of individual subscribers' profiles, tastes and preferences so that the subscribers are better satisfied. However, pursuing the subscribers' requirements alone conflicts with commercial sponsors' desires to insert their advertisement information into those contents related to the products or services marketed or offered by the sponsors. Content providers, for their part, may wish to have the sponsors insert their advertisement information in accordance with the details of the offered contents and in keeping with the context of content distribution.

Illustratively, a content distribution system involving a content provider, sponsors, and subscribers may be organized in such a manner as to constitute a business model called the advertisement selecting business, wherein the three parties involved may have their requirements fulfilled in a manner maximizing the degree of satisfaction for the system as a whole.

Individual contents offered by the content provider retain their own attribute information together with requirements regarding the selection of advertisement information to be inserted into the contents in question. Individual pieces of advertisement information prepared by the sponsors hold their own attribute information along with requirements specifying which advertisement information is to be inserted selectively into what kind of contents. Individual subscribers also have their own attribute information supplemented by requirements about what kind of advertisement information they wish to watch selectively.

However, there has been few advertisement information offering services that would selectively offer advertisement information by taking into account the overall benefits of the three parties, i.e., subscribers, sponsors, and content providers.

Some conventional advertisement selecting systems are selectively designed to insert specific advertisement information into certain contents by taking into consideration the satisfaction of part or all of the content provider, commercial sponsors, and subscribers involved. However, if the calculated values of cost effectiveness are used as the sole criteria for selecting advertisement information to be exposed, only the first-ranked advertisement information, i.e., information deemed to be the most applicable to the subscriber, is repeatedly exposed; and the information ranked in second and subsequent places tends to be slow in getting exposed.

In such cases, the prepared inventory of advertisements is not effectively utilized. Indeed, most of the stored advertisement information is just hoarded up and remains idle. When the income picture is one-sided in favor of particular sponsors, other sponsors cannot get their advertisement information exposed in desired volumes. Subscribers, for their part, watch certain advertisements so frequently that they become tired of them. The effectiveness of advertisements as a whole thus dwindle down. In such advertisement personalizing services, the sponsors are billed for the advertising (sponsoring) fees reflecting the number of times their advertisement information has been exposed. With the lopsided exposure of advertisements they handle, the content providers collect fees only from specific (or limited) sponsors so that their advertising revenues are diminished correspondingly.

As a result, the content distribution services may let their viability and their functionality as advertising media be seriously compromised in the eyes of those they do business with.

DISCLOSURE OF INVENTION

It is therefore an object of the present invention to overcome the above and other deficiencies of the prior art and to provide an advertisement selecting system, an advertisement selecting method, and a storage medium for properly selecting advertisement information to be inserted into contents that are distributed over a wide-area network such as the Internet.

It is another object of the present invention to provide an advertisement selecting system, an advertisement selecting method, and a storage medium for selecting, in a manner personalized for each subscriber, advertisement information used in contents that are offered to the subscribers under a pull-type distribution scheme over the Internet or similar networks.

It is a further object of the present invention to provide an advertisement selecting system, an advertisement selecting method, and a storage medium for selectively attaching advertisement information to contents in a manner both personalized for each subscriber and better reflecting the interests of the subscribers, commercial sponsors, and content providers.

It is an even further object of the present invention to provide an advertisement selecting apparatus, an advertisement selecting method, and a storage medium for controlling exposure of advertisement information to subscribers in a manner both corresponding to the inventory of advertisements and taking into account factors reflecting the past results of having exposed these advertisements to the subscribers.

It is a still further object of the present invention to provide an advertisement selecting apparatus, an advertisement selecting method, and a storage medium for controlling exposure of advertisement information in such a manner that exposure will not concentrate on particular (or limited) advertisement information out of the inventory of advertisements.

In achieving the foregoing and other objects of the present invention and according to a first aspect thereof, there is provided an advertisement selecting system or method for selecting advertisement information to be inserted into contents requested by a subscriber for audiovisual use in an information-providing space, involving parties made up of a content provider providing contents, a commercial sponsor offering advertisement information to be attached to the contents, and the subscriber, and the advertisement selecting system or method including means or steps of: comparing means or step for comparing attribute information held individually by the contents, the advertisement information, and the subscriber, with requirements held individually by the contents, the advertisement information, and the subscriber regarding the selection of advertisements, in order to acquire individual degrees of satisfaction for the content provider, the commercial sponsor, and the subscriber; and selecting means or step for selecting the advertisement which maximizes the overall degree of satisfaction for the content provider, the commercial sponsor, and the subscriber, as the selected advertisement to be inserted into the contents requested by the subscriber for audiovisual use.

Throughout this description, the term "system" refers to a logically aggregated set of a plurality of component devices (or functional modules each implementing specific capabilities); and whether the devices (or modules are housed in a single enclosure does not matter (same for the following).

Where the advertisement selecting system or method according to the first aspect of the invention is in use, the attribute information held individually by the contents, advertisement information and subscriber is compared with the requirements held by the contents, advertisement information and subscriber regarding the selection of advertisement. The comparison yields individual degrees of satisfaction or cost effectiveness for the content provider, commercial sponsor and subscriber. The degrees resulting from the comparison are referenced in selecting advertisement information to be inserted into contents.

Therefore, the advertisement information is selected in a manner not excessively favoring any one of the parties making up the information-providing space, but maximizing the degree of satisfaction for the system as a whole, whereby the contents are offered to subscribers in personalized fashion.

Preferably, the contents may hold the requirements related to attributes and advertisements; the advertisement information may hold the requirements related to attributes, contents and subscribers; and the subscriber may hold the requirements related to attributes and advertisements.

In the case above, the comparing means or step may further include means or steps of: first comparing means or step for comparing the attribute information held by the advertisement information with the requirements of the contents; second comparing means or step for comparing the attribute information held by the contents with the requirements of the advertisement information; third comparing means or step for comparing the attribute information held by the subscriber with the requirements of the advertisement information; and fourth comparing means or step for comparing the attribute information held by the advertisement information with the requirements of the subscriber.

The selecting means or step, according to the first to fourth means or steps, may preferably select the advertisement to be inserted into the contents requested by the subscriber for audiovisual use, based on the comparison between at least one requirement and the corresponding attribute.

The selecting means or step, according to the first to fourth means or steps, may preferably assign score to the individual degrees of satisfaction for the content provider, the commercial sponsor, and the subscriber in a manner reflecting a policy for advertisement selection, before selecting the advertisement which maximizes the degree of satisfaction for the system as a whole.

In the above case, a business operator controlling the selection of advertisement information to be inserted into contents can control the score of requirements for the three parties involved, i.e., the content provider, commercial sponsor, and subscriber. It is thus possible for the advertisement selection business operator to reflect its intentions in comparing the attributes with the requirements regarding the selection of advertisements.

Preferably, the attribute information held individually by the contents, the advertisement information, and the subscriber may be made up of a plurality of items; and the requirements held individually by the contents, the advertisement information, and the subscriber regarding the selection of advertisements with respect to the other parties involved may be constituted by a plurality of items.

In that case, the content provider may set the relevant items in a manner representing the attributes of the contents provided by the convent provider and the requirements of the content provider with respect to the other parties involved; the commercial sponsor may set the relevant items in a manner representing the attributes of the contents offered by the commercial sponsor and the requirements of the commercial sponsor with respect to the other parties involved regarding the selection of advertisements; and the subscriber may set the relevant items in a manner representing the attributes of the subscriber and the requirements of the subscriber with respect to the other parties involved regarding the selection of advertisements.

Preferably, the content provider, the commercial sponsor and the subscriber may each set the items making up the attribute information and the items constituting the requirements for the selection of advertisements in one of the manners consisting of: a restricting manner, a preferring manner, an inhibiting manner, and a grading manner. The restricting manner may make the selection exclusively if a requirement is met; the preferring manner may make the selection preferably, not exclusively, if a requirement is met; the inhibiting manner may inhibit the selection if a requirement is met; and the grading manner may represent in numbers the degree of preference for each requirement.

Preferably, the content provider, the commercial sponsor, and the subscriber may each be allowed to set on an item-by-item basis the attribute information and the requirements held thereby regarding the selection of advertisements and may each be allowed to specify whether each item of the requirements is to be either met or not met regarding the selection of advertisements.

Preferably, the comparing means or step above may represent in numbers the degree of satisfaction for each of the parties involved.

Preferably, upon comparison, the comparing means or step above may clearly distinguish the attribute information held individually by the contents, the advertisement information, and the subscriber, from the requirements held individually by the contents, the advertisement information, and the subscriber regarding the selection of advertisements. This feature is designed to forestall cases where advertisements of a totally different kind from those desired by the subscriber could be inserted in order to reflect the inventions of the commercial sponsor.

Preferably, either the attribute information or the requirements alone may be allowed to be set. In this case, the comparing means or step may handle the settings either of the attribute information or of the requirements as those of the other as well.

Preferably, the contents, the advertisement information, and the subscriber may each have a plurality of items of attribute information and/or a plurality of requirements regarding the selection of advertisements. In this case, the comparing means or step may either handle the attribute information and the requirements selectively, or compare any of the plurality of items and the plurality of requirements, depending on circumstances.

Preferably, where the attribute information held individually by the contents, the advertisement information, and the subscriber is made up of a plurality of items; and the requirements held individually by the contents, the advertisement information, and the subscriber regarding the selection of advertisements with respect to the other parties involved are constituted by a plurality of items, the content provider, the commercial sponsor and the subscriber may each set the items making up the attribute information and the items constituting the requirements for the selection of advertisements in one of the manners consisting of a restricting manner, a preferring manner, an inhibiting manner, and a grading manner. The restricting manner may consist of making the selection exclusively if a requirement is met; the preferring manner may consist of making the selection preferably, not exclusively, if a requirement is met; the inhibiting manner may consist of inhibiting the selection if a requirement is met; and the grading manner may consist of representing in numbers the degree of preference for each requirement. In such cases, the comparing means or step may compare initially the items set in the restricting manner and in the inhibiting manner, before comparing the items set in the grading manner. This feature is designed to reduce the workload on the selecting means or step above in extracting candidate advertisements.

Preferably, the comparing means or step above may verify initially the items set in the restricting manner before verifying the items set in the inhibiting manner. This feature is also designed to reduce the workload on the selecting means or step in extracting candidate advertisements.

According to a second aspect of the invention, there is provided a storage medium which stores physically, in a computer-readable format, computer software for causing a computer system to select advertisement information to be inserted into contents requested by a subscriber for audiovisual use in an information-providing space involving parties made up of a content provider providing contents, a commercial sponsor offering advertisement information to be attached to the contents, and the subscriber, and the computer software including the steps of: a comparing step for comparing attribute information held individually by the contents, the advertisement information, and the subscriber, with requirements held individually by the contents, the advertisement information, and the subscriber regarding the selection of advertisements, in order to acquire individual degrees of satisfaction for the content provider, the commercial sponsor, and the subscriber; and a selecting step for selecting the advertisement which maximizes the overall degree of satisfaction for the content provider, the commercial sponsor, and the subscriber, as the selected advertisement to be inserted into the contents requested by the subscriber for audiovisual use.

The storage medium according to the second aspect of the invention is any one of storage media that offer computer software in a computer-readable format illustratively to a general-purpose computer system capable of executing diverse program codes. Such storage media typically include CDs (compact discs), FDs (flexible discs), MOs (magneto-optical discs), and other portable media that are readily mounted and discounted. It is also technically possible to transmit computer software to a specific computer system over transmission media such as networks (which may be wired or wireless).

The storage medium is arranged so as to define its structurally or functionally collaborative relations with computer software that causes a computer system to implement specific functions. In other words, when relevant computer software is installed into the computer system via the storage medium according to the second aspect of the invention, the computer system operates in collaboration with the installed software to provide the same effects as those of the advertisement selecting system and method according to the first aspect of the invention.

According to a third aspect of the invention, there is provided an advertisement selecting apparatus or method for selecting advertisement information for exposure to a subscriber, the advertisement selecting apparatus or method including means or steps of: advertisement exposure result managing means or step for managing results of the past exposure to the subscriber of individual advertisements constituting the advertisement information; and advertisement information selecting means or step for selecting, from among candidate advertisements, those to be exposed to the subscriber based on the results of the past exposure.

In a case where moving picture contents are distributed by streaming technology to the subscriber illustratively over the Internet, the advertisement selecting apparatus or method according to the third aspect of the invention allows the advertisement information such as commercials to be selectively inserted into a slot within the contents based on the results of the past exposure, i.e., in a manner reflecting the number of times each of the advertisements involved has been exposed to the subscriber.

Preferably, the advertisement information selecting means or step above may select the advertisement information by taking into account an exposure count quota imposed on each of the individual advertisements.

Preferably, the advertisement selecting apparatus may further include means or step for acting, in response to a content viewing request made by the subscriber, to insert the advertisement information selected by the advertisement information selecting means or step into a slot within contents before providing the contents to the subscriber.

Preferably, in an information-providing space involving parties made up of a content provider providing contents, a commercial sponsor offering advertisement information to be attached to the contents, and the subscriber, the advertisement information selecting means or step above may compare attribute information held individually by the contents, the advertisement information, and the subscriber, with requirements held individually by the contents, the advertisement information, and the subscriber regarding the selection of advertisements, in order to acquire individual degrees of satisfaction for the content provider, the commercial sponsor, and the subscriber. The advertisement information selecting means or step may further obtain at least one candidate advertisement through calculation based on the individual degrees of satisfaction for the parties involved. The advertisement information selecting means or step above may then select the advertisement from the obtained candidate advertisements in accordance with the result of the past exposure regarding each of the individual advertisements.

Preferably, each of the individual advertisements may have a selection priority for exposure to the subscriber, and the advertisement information selecting means or step above may select the advertisement information to be exposed to the subscriber by taking into account the selection priority of each of the individual advertisements and the results of the past exposure. Typically, the exposure results may be updated in real time as viewing by the subscriber is taking place.

Illustratively, the advertisement information selecting means or step above may select the advertisement information to be exposed to the subscriber based on the selection priority of each of the individual advertisements which is multiplied by a degree of exposure inhibition derived from a predetermined inhibition coefficient being raised to the power of a past advertisement exposure count of the advertisement in question.

The advertisement selecting apparatus and method according to the third aspect of the invention may be used illustratively in conjunction with an advertising system for inserting advertisement information such as commercials into moving picture contents distributed by streaming technology over the Internet. When selecting advertisements to be exposed to the subscriber over the Internet, the system takes into account the result of past exposure of each of the advertisements in exposure control reflecting the advertisement inventory.

Illustratively, if subscribers with a particular profile biased to specific tastes or preferences gain access to contents that carry advertisements, the first-ranked advertisement, i.e., the one best targeted for the subscribers in question, is exposed repeatedly but in a manner also making way for the advertisements in second and subsequent places which would be less likely to be exposed if handled conventionally, so that the stocked advertisements are exposed in fairly averaged fashion.

The inventive apparatus and method thus allow commercial sponsors to schedule their advertisement exposure. As a result, content/advertisement providing systems implementing this invention have their values significantly enhanced as viable advertising media.

During system operation, the advertisement selecting apparatus and method according to the third aspect of the invention permit advertisement exposure control by monitoring the inventory of advertisements. This makes it more or less possible to bring about a desired peak-to-valley exposure picture during the term of the contract, which offers numerous exposure menus to the commercial sponsor under contract.

Preferably, the advertisement information selecting means or step above may select the advertisement information to be exposed to the subscriber by taking into account the selection priority of each of the individual advertisements, the results of the past exposure, and an exposure count quota imposed on each of the individual advertisements. More specifically, the advertisement information selecting means or step may select the advertisement information to be exposed to the subscriber by inhibiting the selection priority of each of the individual advertisements in keeping with an increase of a quota attainment quotient obtained by dividing the results of the past exposure by an exposure count quota imposed on each of the individual advertisements.

Illustratively, the exposure count quota may be calculated for a certain period (e.g., one day) based on the term of an advertisement exposure contract and on the number of times the advertisement in question is expected to be exposed during the contract period. The quota is updated periodically (e.g., every day). Calculation of the quota may take into account such factors affecting the viewing count (exposure count) as days of the week, holidays, festival days, and consecutive holidays.

According to a fourth aspect of the invention, there is provided a storage medium which stores physically, in a computer-readable format, computer software for causing a computer system to select advertisement information for exposure to a subscriber, the computer software including the steps of: a managing step for managing results of the past exposure to the subscriber of individual advertisements constituting the advertisement information; and a selecting step for selecting, from among candidate advertisements, those to be exposed to the subscriber based on the results of the past exposure.

The storage medium according to the fourth aspect of the invention is any one of storage media that offer computer software in a computer-readable format illustratively to a general-purpose computer system capable of executing diverse program codes. Such storage media typically include CDs (compact discs), FDs (flexible discs), MOs (magneto-optical discs), and other portable media that are readily mounted and discounted. It is also technically possible to transmit computer software to a specific computer system over transmission media such as networks (which may be wired or wireless).

The storage medium is arranged so as to define its structurally or functionally collaborative relations with computer software that causes a computer system to implement specific functions. In other words, when relevant computer software is installed into the computer system via the storage medium according to the fourth aspect of this invention, the computer system operates in collaboration with the installed software to provide the same effects as those of the advertisement selecting apparatus and method according to the third aspect of the invention.

Other objects, features and advantages of the invention will become more apparent upon a reading of the following description and appended drawings.

BRIEF DESCRIPTION OF DRAWINGS

FIG. 11 is a schematic view showing how to grade in numbers an item (children) included in content category INOUT data;

FIG. 12 is a schematic view showing how to grade in numbers an item (children) included in TargetINOUT data;

FIG. 13 is a schematic view depicting a data structure of the TargetINOUT data;

FIG. 14 is a schematic view showing how to grade in numbers an item included in content category data as part of content attribute information;

FIG. 18 is a schematic view explaining how the subscriber OPTINOUT data shown in FIG. 6 are divided into a positive and a negative side for use;

FIG. 19 is another schematic view explaining how the subscriber OPTINOUT data shown in FIG. 6 are divided into the positive and the negative side for use;

FIG. 26 is an explanatory view indicating how a set of scored advertisement information is redefined while being expanded by the number of times the set is allowed to be inserted repeatedly;

FIG. 27 is a schematic view giving (specific) results of processing performed by an MP unit 42 in phase 2;

FIG. 28 is a schematic view giving a comprehensive sketch of the results of processing performed by the MP unit 42 in phase 2 shown in FIG. 27;

FIG. 29 is a schematic view illustrating a functional structure of an advertisement exposure control system implemented on the advertisement selecting server 40 according to the invention;

FIG. 34 is still another graphic representation picturing characteristics of the function f(x) for acquiring the degree of exposure inhibition for individual pieces of advertisement information based on the quota attainment quotient "x."

BEST MODE FOR CARRYING OUT THE INVENTION

Preferred embodiments of this invention will now be described in detail with reference to the accompanying drawings.

A. System Configuration

Figure 1:
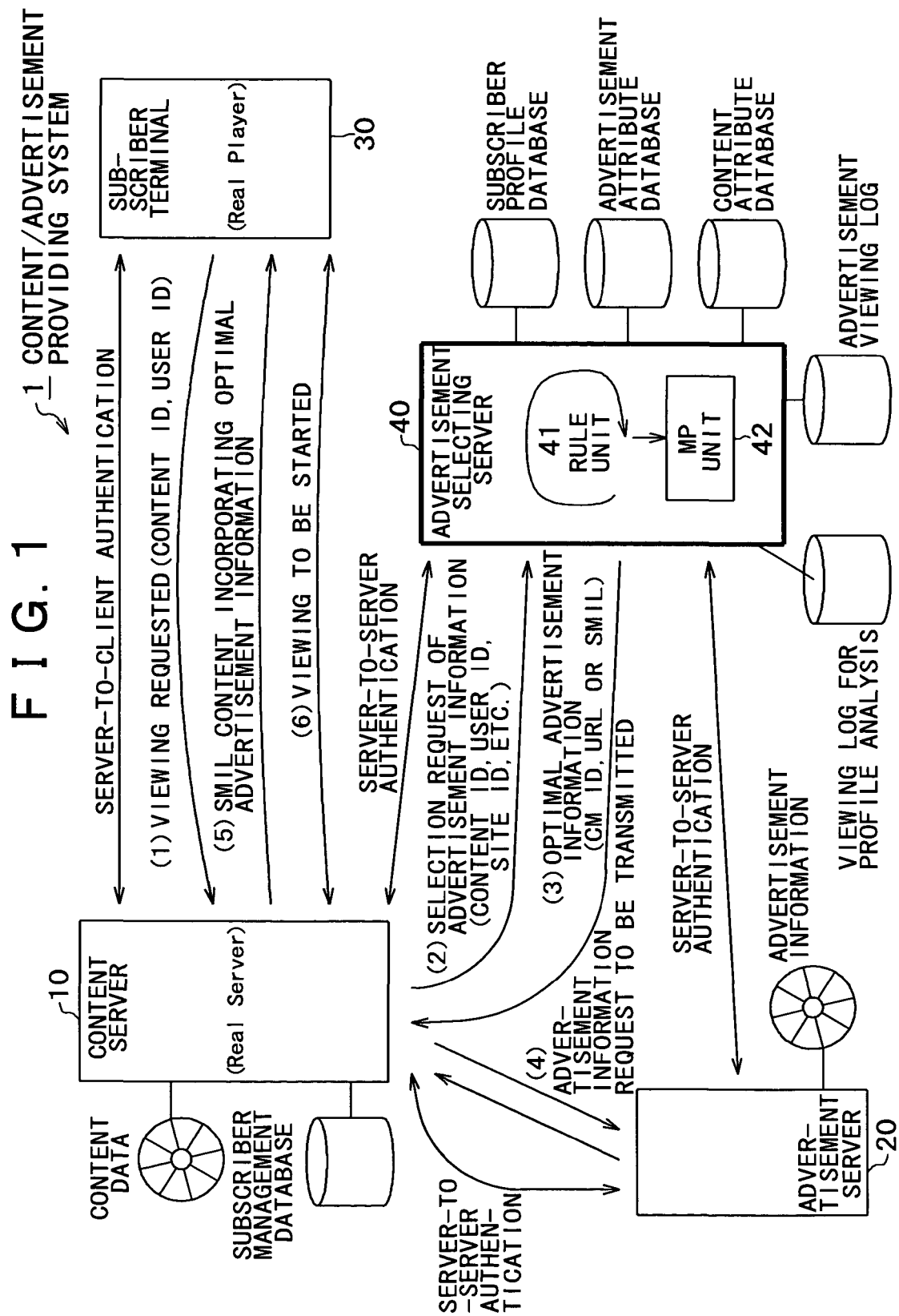
FIG. 1 is a schematic view showing a configuration of a content/advertisement providing system 1 according to the invention.

FIG. 1 schematically shows a configuration of a content/advertisement providing system 1 embodying the invention. The system 1 distributes illustratively image contents made up of moving pictures to subscribers over a wide-area network such as the Internet together with personalized advertisement information targeted for the subscribers.

As illustrated in FIG. 1, the content/advertisement providing system 1 is constituted by a content server 10, an advertisement server 20, a subscriber terminal 30, and an advertisement selecting server 40. The content server 10 is run by a content provider offering a content distribution service involving the distribution of contents such as images. The advertisement server 20 is operated by a commercial sponsor offering accumulated advertisement information to be inserted into contents for distribution. The subscriber terminal 30 is owned by a subscriber viewing distributed contents. The advertisement selecting server 40 is run by an advertisement selection business operator offering a personalized advertisement selection service involving the selection of advertisement information to be inserted into contents for distribution.

In the description that follows, the content provider, commercial sponsor, subscriber, and advertisement selection business operator taking part in the content/advertisement providing system 1 will also be referred to as the players where appropriate.

The server machines 10, 20 and 40 may each be implemented illustratively by starting up a suitable server application program on a workstation (WS) or a personal computer (PC). The subscriber terminal 30 may be implemented illustratively by booting a client application program such as a Web browser on the personal computer.

The server and client machines are connected to a TCP/IP network such as the Internet through physical connecting means such as the Ethernet (registered trademark). The machines are interconnected securely through appropriate authenticating procedures.

The subscriber terminal 30 is connected to the content server 10 via the network. By operating the subscriber terminal 30, the subscriber may designate contents such as moving pictures to be provided by the content server 10. Where the content server 10 incorporates streaming techniques such as RealServer and where the subscriber terminal 30 has moving picture playback software such as RealPlayer installed therein, the subscriber is able to watch and listen to the requested content in real time.

The content server 10 is also connected to the advertisement server 30 and advertisement selecting server 40 via the network. In this setup, the content server 10 can issue an advertisement selection request to the connected servers, i.e., a request for advertisement information to be inserted into the content requested by the subscriber for distribution. The advertisement information selected by and returned from the advertisement selecting server 40 is acquired from the advertisement server 20 and inserted into the content, whereby the advertisement in question is exposed on the subscriber terminal 30.

The content server 10 of this invention also has the function of detecting advertisement information being exposed on the subscriber terminal 30. Upon advertisement exposure, the content server 10 transmits an advertisement viewing log to the advertisement selecting server 40. Illustratively, suitable plug-in software may be installed into the content server 40 so as to implement on the server 40 such extended functions as the request for selection of advertisements and the transmission of advertisement exposure logs.

The advertisement selecting server 40 is connected via the network to various databases such as those of subscriber profiles, advertisement attributes, and content attributes. Upon receipt of an advertisement selection request from the content server 10, the advertisement selecting server 40 selects advertisement information to be exposed along with contents in keeping with the details of the request and based on what is available from the databases. When receiving an advertisement exposure log from the content server 10, advertisement selecting server 40 stores the received log into a database as part of an advertisement viewing history.

The advertisement selecting server 40 is implemented using a workstation or a personal computer capable of running a server application "Weblogic Server." Software for processing advertisement selection requests and storing advertisement exposure logs may be described illustratively in Java Program.

The databases for accumulating subscriber information (tastes, preferences, ages, addresses), advertisement attributes (for subscriber targeting), content attributes (information about preferential advertisements), etc., may be implemented illustratively using a workstation or a personal computer capable of running Oracle, i.e., a relational database (RDB) system.

Figure 2:
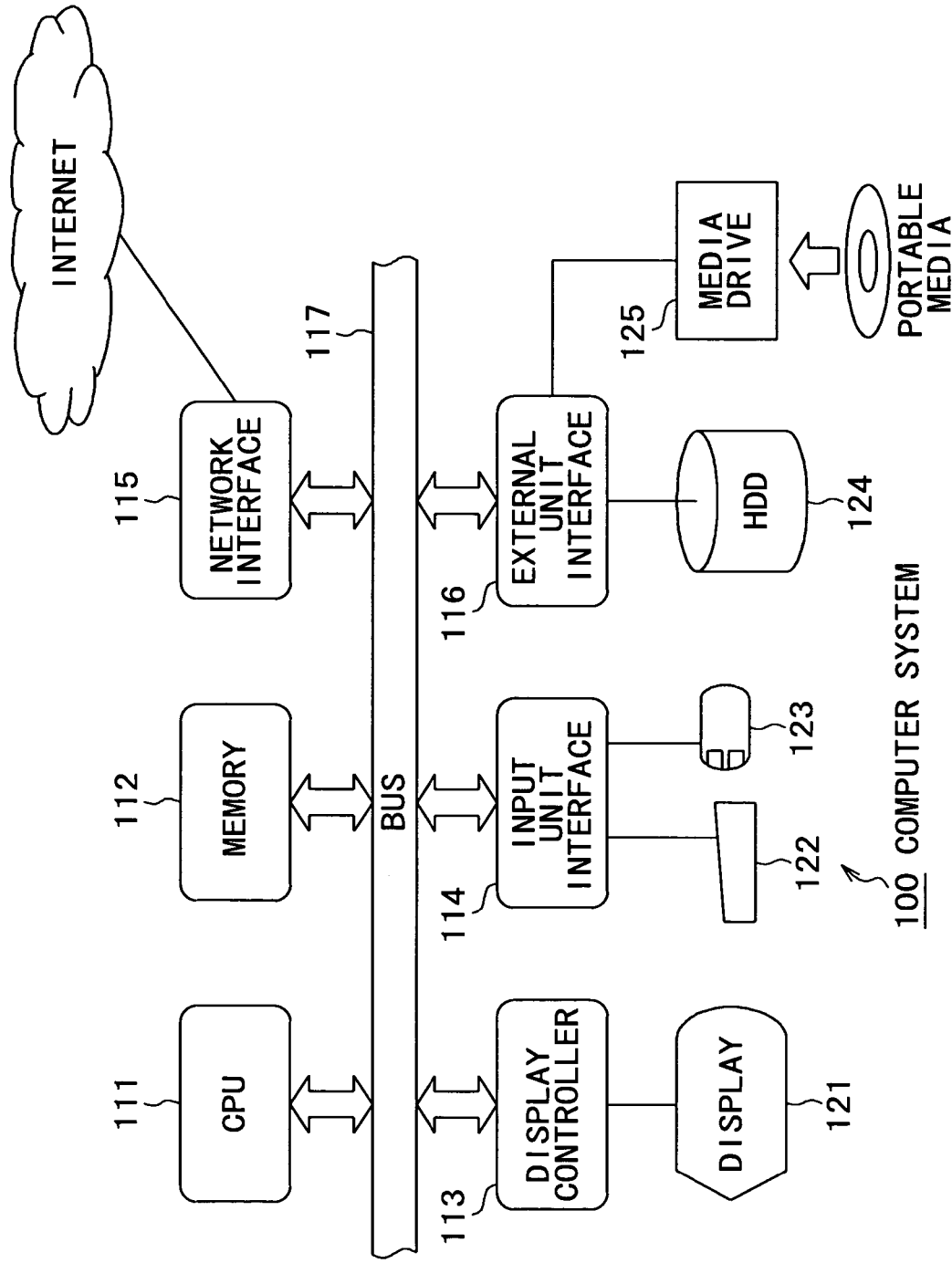
FIG. 2 is a schematic view depicting a structure of a computer system that may be used as a server or a client.

What follows is a description of a computer system that can constitute a host terminal acting as any of the servers 10, 20 and 40 catering to their clients. FIG. 2 schematically illustrates a typical hardware configuration of this computer system 100.

A CPU (central processing unit) 111, main controller of the system 100, performs various application programs under control of an operating system (OS). Illustratively, when the CPU 111 executes a server application for providing contents, a server application for providing advertisement information, a server application for selecting advertisement information to be inserted into contents, or a client application for viewing contents, the system 100 functions as the server 10, 20, 40, or subscriber terminal 30, respectively.

As shown in FIG. 1, the CPU 111 is interconnected with other component devices (to be described later) via a bus 117. The devices on the bus 117 are each given a unique memory address or I/O address. These addresses allow the CPU 111 to access the corresponding devices. The bus 117 is typically a PCI (Peripheral Component Interconnect) bus.

A memory 112 is a storage device that temporarily accommodates program codes being executed or work data being handled by the CPU 111. The memory 112 in FIG. 2 embraces a volatile and a nonvolatile memory.

A display controller 113 is a dedicated controller for actually processing graphics-drawing instructions issued by the CPU 111. Illustratively, the controller 113 supports bit-mapped graphics-drawing functions compatible with SVGA (Super Video Graphic Array) or XGA (extended Graphic Array) norms. Graphic data processed by the display controller 113 are written temporarily to a frame buffer (not shown) before being output onto a display unit 121. The display unit 121 is illustratively a CRT (cathode ray tube) display or an LCD (liquid crystal display).

An input unit interface 114 is designed to interface user input units such as a keyboard 122 and a mouse 123 to the system 100. As will be described later, it is necessary to enter various items of attribute information into the content providing server 10 regarding contents, into the advertisement providing server 10 about advertisement information, and into the subscriber terminal 30 with respect to the subscriber, along with requirements (OPTINOUT information) for advertisement selection. The computer system 100 allows settings of these items to be input through the keyboard 122 and mouse 123. The detailed settings of the items making up the attribute information about contents, advertisement information and subscriber, as well as the requirements (OPTINOUT information) regarding the selection of advertisements, will be discussed later.

A network interface 115 is designed to interface the system 100 to a network such as a LAN (local area network) in accordance with suitable communication protocols like the Ethernet (registered trademark). Generally, the network interface 115 is furnished in the form of a LAN adapter card that is inserted into a PCI bus slot on a motherboard (not shown). Alternatively, the system 100 may be connected to an external network not through the network interface but via a modem (not shown).

On the LAN, a plurality of host machines (computers) are connected in a transparent manner constituting a distributed computing environment. Part of the host machines operate as routers connected to external networks such as other LANs and the Internet. Over the Internet, software programs and data contents are distributed through the routers.

It is assumed for this embodiment that contents and advertisement information to be inserted into the contents are distributed over the network. Illustratively, the content server 10 distributes contents such as moving pictures to subscriber terminals by streaming technology.

The attribute information set for contents, for advertisement information and for subscribers, along with the requirements (OPTINOUT information) regarding the selection of advertisements, may be moved between systems over the network. On the computer system working as the advertisement selecting server 40, the attribute information set for contents, advertisement information and subscribers together with the requirements (OPTINOUT information) regarding advertisement selection is stored in databases. When a subscriber requests a certain content, the advertisement information to be inserted into the requested content is selected by a matching process involving these databases in a manner maximizing the benefits for the content/advertisement providing system 1 as a whole (as will be discussed later). The advertisement selecting server 40 can report the result of the advertisement information selection to other host terminals such as the content server 10 and advertisement server 30 over the network.

An external unit interface 116 is designed to interface external units such as a hard disc drive (HDD) 124 and a media drive 125 to the system 100. The external unit interface 116 complies illustratively with such interface standards as IDE (Integrated Drive Electronics) and SCSI (Small Computer System Interface).

The HDD 124 is a known external storage unit that has magnetic discs mounted in fixed fashion as storage media. The HDD 124 is superior to other external storage devices in terms of storage capacity and data transfer speed. When a software program is placed onto the HDD 126 in an executable manner, the program is said to be "installed" into the system. Usually, the HDD 124 accommodates in nonvolatile fashion the program codes of the operating system to be executed by the CPU 111, as well as application programs and device drivers.

For example, the content server application program, advertisement server application program, advertisement selection server application program, and subscriber terminal client application program of this embodiment are installed on the HDD 124. The HDD 124 may also accumulate the attribute information established with respect to contents, advertisement information, and subscribers, along with the requirements (OPTINOUT information) regarding the selection of advertisements. The advertisement selecting server 40 may record onto the HDD 124 an advertisement viewing history made up of advertisement exposure logs detailing the advertisements having been exposed to the subscribers.

The media drive 125 is a device which, when loaded with portable media including the CD (compact disc), MO (magneto-optical disc) and DVD (digital versatile disc), gains access to their data recorded surfaces. The portable media are used primarily for the backup of software programs and data files in a computer-readable format, as well as for moving these resources between systems (e.g., for marketing and distribution).

Illustratively, the content server application program, advertisement server application program, advertisement selection server application program, and subscriber terminal client application program of this embodiment may be distributed using such portable media. Furthermore, the portable media may be used to distribute the attribute information established with regard to contents, advertisement information, and subscribers, along with the requirements (OPTINOUT information) relative to the selection of advertisements. Obviously, moving picture contents carrying personalized advertisement information targeted for individual subscribers may also be placed on this type of storage media for movement between systems, instead of being distributed by streaming from the content server 10.

The computer system 100 in FIG. 2 is typically a PC/AT (Personal Computer/Advanced Technology) compatible computer or its successor. A computer system having a different architecture may also be utilized as a host terminal of this embodiment.

B. Personalized Content Distribution Service

The content/advertisement providing system 1 shown in FIG. 1 provides advertisement-carrying contents to the subscriber terminal 30 in the following steps:

(1) The subscriber terminal 30 makes a content-viewing request to the content server 10.

(2) The content server 10 requests the advertisement selecting server 40 to select advertisement information to be inserted into the requested content.

(3) The advertisement selecting server 40 selects advertisement information deemed optimal through the process of matching the subscriber's profile with advertisement and content attributes (to be described later), and notifies the requesting content server 10 of the selected information.

(4) The content server 10 acquires the optimal advertisement information from the advertisement server 20.

(5) The content server 10 inserts the acquired optimal advertisement information into the content designated by the subscriber terminal 30, and distributes the content to the subscriber terminal 30 in SMIL (Synchronized Multimedia Integrated language) format.

(6) The designated moving picture content is playbacked in real time on the subscriber terminal 30.

The SMIL (Synchronized Multimedia Integrated language), worked out and established by W3C (WWW Consortium), is an integrating technology for displaying independent multimedia objects in a synchronized manner. Data written in SMIL format can describe the temporal behavior in audiovisual multimedia presentations and presentation layouts on the screen.

When the subscriber selects the content, the advertisement selecting server 40 coordinates the interests of the subscriber, content provider, commercial sponsor, and advertisement selection business operator before selecting a suitable advertisement from the group of advertisement information stored in the advertisement server 20.

Figure 3:
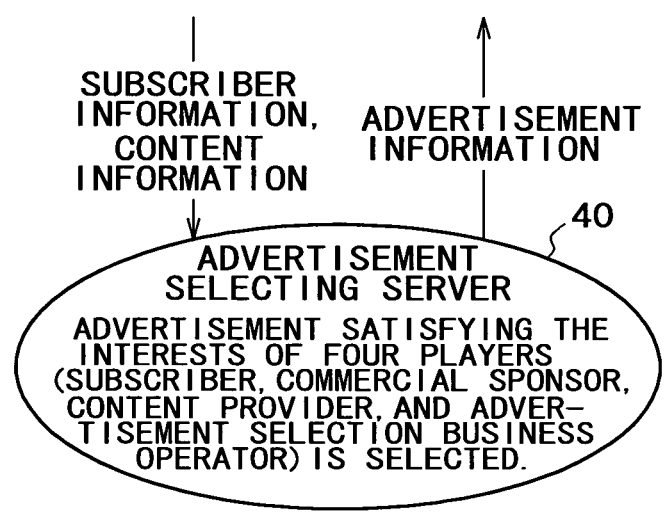
FIG. 3 is a conceptual view of an advertisement selecting server 40.
Figure 4:
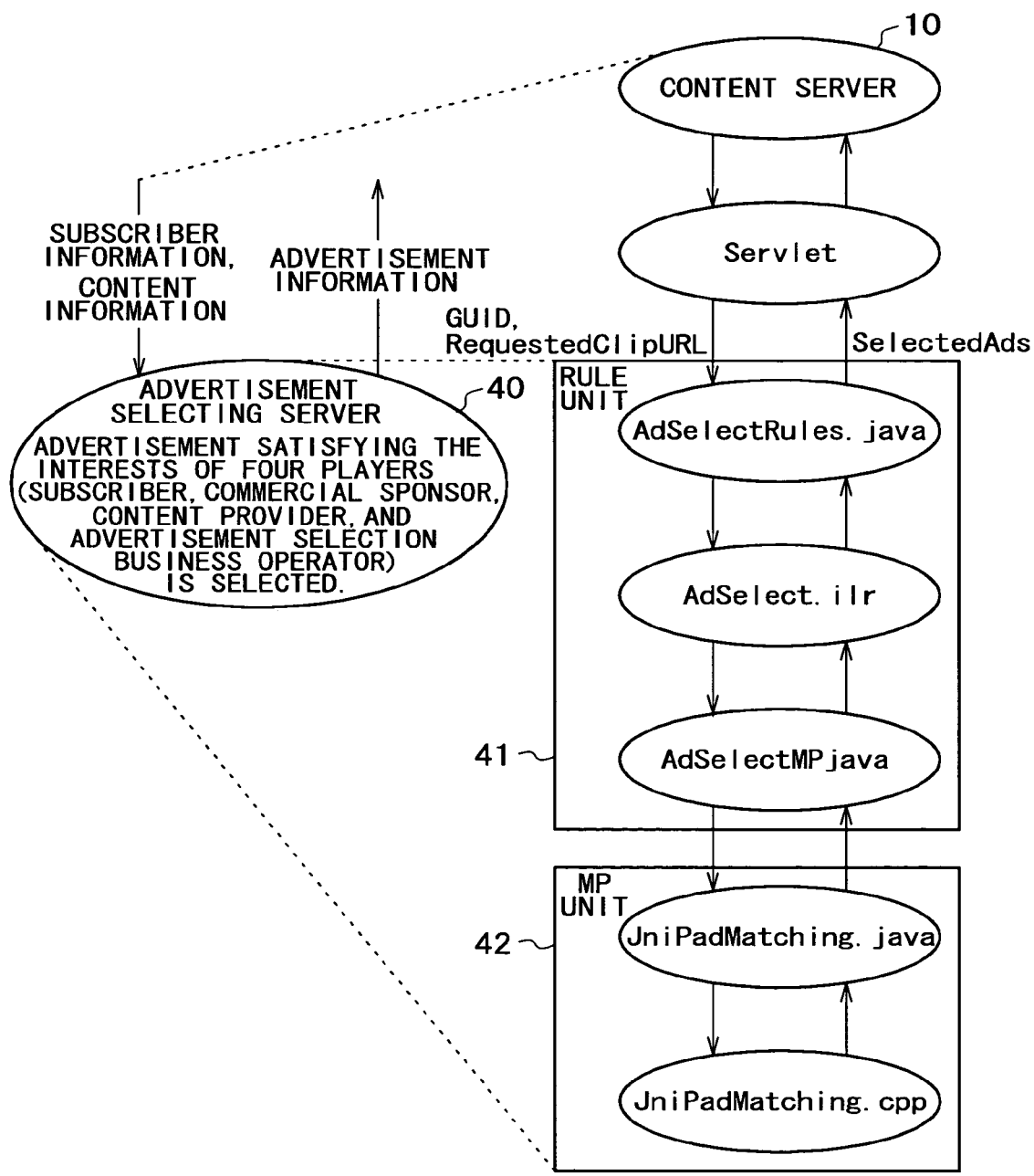
FIG. 4 is a schematic view illustrating a structure of mounted modules in the advertisement selecting server 40 according to the invention.

FIGS. 3 and 4 give conceptual views of the advertisement selecting server 40. This server is constituted by a rule unit 41 and an MP (mathematical programming) unit 42.

The rule unit 41 verifies restrictions on the matching between the attributes of the players involved and their advertisement selection requirements (i.e., extraction of candidate advertisements). The unit 41 also prepares cost allocation (cost allocation of candidate advertisements). The MP unit 42 narrows down candidate advertisements through a linear programming problem, and calculates assignment of candidate advertisements to a slot through an integer programming problem.

With this embodiment, the advertisement selecting server 40 performs comparisons (also called matching hereunder), between the players, of their attribute information and their guidelines or requirements (called OPTINOUT information) regarding the selection of advertisement information. The server 40 selects advertisements based on the result of the matching.

FIG. 4 is a schematic view illustrating a structure of mounted modules in the advertisement selecting server 40 according to the invention. As shown FIG. 4, the rule unit 41 is constituted by modules called AdSelectRules.java, AdSelect.ilr, and AdSelectMP.java.

The AdSelectRules.java module receives an advertisement selection request from a Servelet module outside and gives a response to the request. The AdSelectRules.java module also loads objects needed for matching into a work area of memory, and starts up a rule engine.

The AdSelect.ilr module is made up of a plurality of rules. They make up a rule set which selects candidate advertisements by taking into account matching-based restrictions and inhibiting conditions and which performs cost allocation of the candidate advertisements.

The AdSelectMP.java module generates information (such as customized cost allocation and advertisement lengths) to be handed over to the MP unit 42. The AdSelectMP.java module also starts up processing of the MP unit 42 and acquires the result of that processing.

The MP unit 42 is constituted by modules called JniPadMatching.java and JniPadMatching.cpp.

The JniPadMatching.java module acts as a JNI Wrapper that invokes a C++ native class (JniPadMatching.cpp) for carrying out processing based on MP (mathematical programming).

The JniPadMatching.cpp module performs actual processes through the use of mathematical programming.

With this embodiment of the invention, the players involved have attribute information specific to each player, or selection guidelines (OPTINOUT information) describing the guidelines or requirements allowing each player to select the other players; or the players have both the attribute information and the selection guidelines each. Some players may have the OPTINOUT information that is the same as their own attribute information.

Attribute information and OPTINOUT information are made up of a plurality of items. In the advertisement selecting server 40, the rule unit 41 matches the corresponding items between the attribute information about one player and the OPTINOUT data about other players regarding the selection of advertisements.

The attribute information constitutes data that represent the attributes of contents, advertisements, and subscribers. The information, making up master data (to be described later), is constituted by a plurality of items. The degree of matching between the items is graded in numbers ranging from 0 to 1.0. In particular, attribute data items that have only two alternatives each (e.g., male or female) are expressed by a number 1 for matching and by 0 for mismatching.

The OPTINOUT data denote guidelines or requirements regarding the selection of advertisements, and are made up of a plurality of items constituting master data, to be described later. Each of the items is graded in numbers with respect to one of four types of attributes: restricting, preferring, inhibiting, or grading, as described below. In the case that the OPTINOUT data are expressed in terms of numbers, each of the items making up the data are graded in numbers ranging from −1.0 to 1.0.

Restricting attribute type: if the condition is met, the advertisement is selected exclusively.

Preferring attribute type: if the condition is met, the advertisement is selected not exclusively but preferentially (i.e., selected at least once).

Inhibiting attribute type: if the condition is met, the advertisement is not selected.

Grading attribute type: the degree of preference for the condition is graded in numbers.

The rule unit 41 selects advertisement information based on the result of matching between attribute information and OPTINOUT data. The content/advertisement providing system 1 of this embodiment carries out the following four major types of matching (see FIG. 5):

Matching 1 (M1): compares advertisement attributes with content OPTINOUT data.

Matching 2 (M2): compares content attributes with advertisement OPTINOUT data.

Matching 3 (M3): compares subscriber attributes and subscriber OPTINOUT data, with advertisement OPTINOUT data.

Matching 4 (M4): compares advertisement attributes with subscriber OPTINOUT data.

Each of these four types of matching is made up of more detailed types of matching, as will be described later.

Figure 5:
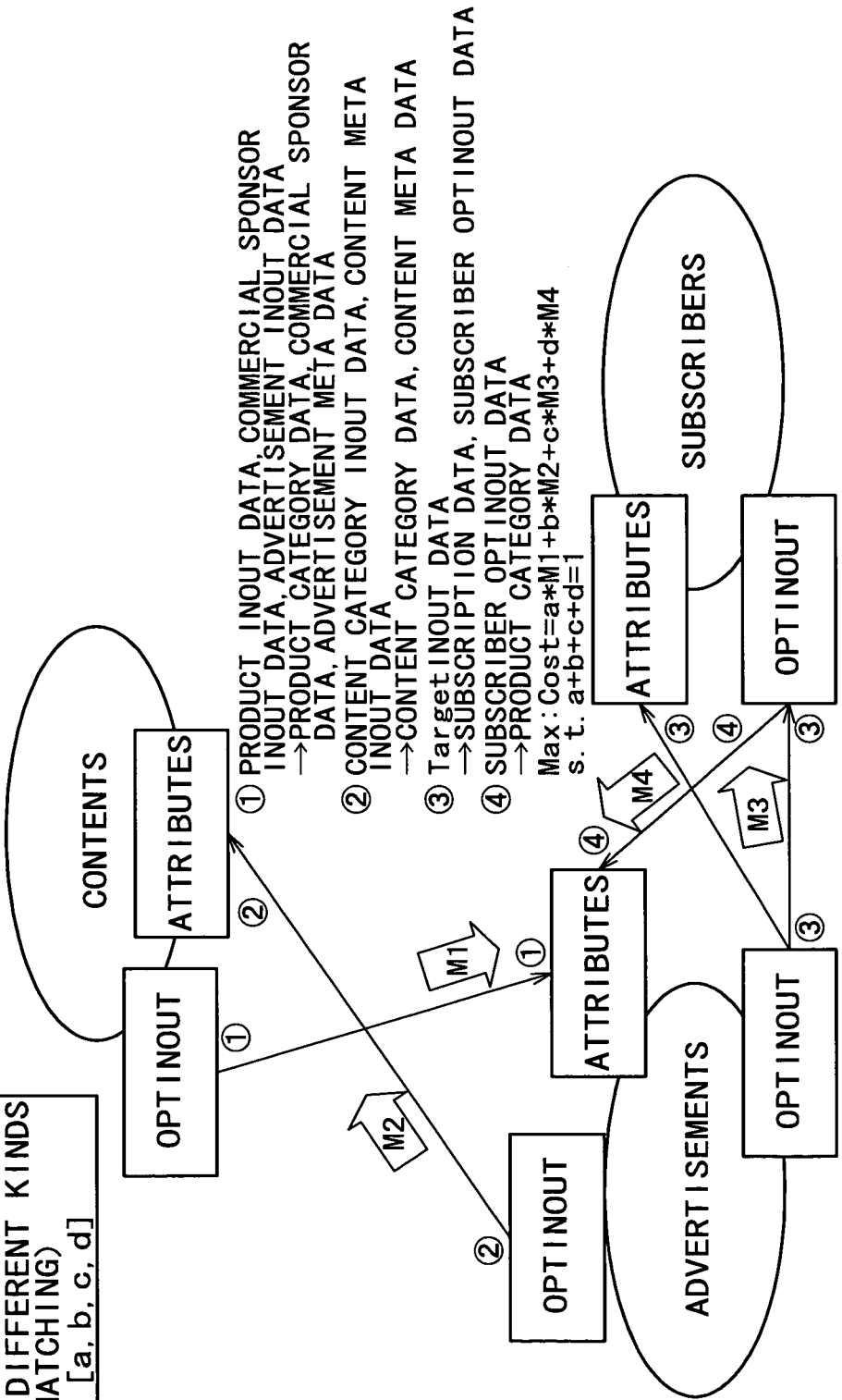
FIG. 5 is a schematic view indicating how matching is done by the content/advertisement providing system 1 of the invention.

As shown in FIG. 5, part of matching 3 involves comparing advertisement OPTINOUT data with subscriber OPTINOUT data. In fact, the actual process considers the subscriber OPTINOUT data to be part of the subscriber attributes.

The four types of matching yield cost allocation for each type. The allocated cost components are scored to reflect the advertisement selection business operator's policy. More specifically, a scoring factor is allotted to each type of matching when the different types of matching are carried out (using the formula below), whereby a definitive cost allocation is generated for a candidate advertisement:

$$Cost = a \times M1 + b \times M2 + c \times M3 + d \times M4$$

(where, $a+b+c+d=1$)

C. Data for Use in Selecting Advertisements

What follows is a detailed description of data used for matching between the players. Because the data for matching by the rule unit 41 and the data entered by each player through a host terminal differ slightly in format, the data to be entered by the players will be discussed first.

Subscriber Attribute Data

The attribute data about each subscriber are composed of subscriber data including: sex, date of birth, country of residence, area of residence, ZIP code for place of residence, ID for country of employment, ID for area of employment, ZIP code for area of employment, mother tongue, knowledge of foreign languages, job ID, annual income ID, marital status, residence ID, and family structure. The subscriber attribute data are to be matched with TargetINOUT data, i.e., advertisement OPTINOUT information.

Subscriber OPTINOUT DATA

The subscriber OPTINOUT data are constituted by the items listed as master data (M_OPT) in Table 1 below. The requirement for each of the items regarding the subscriber in question is described either as an inhibiting type or as a grading type. If the description is of grading type, the item in question is graded in numbers ranging from −1.0 to 1.0. Illustratively, for an item "children," a value close to 1 is input if it is desired to watch child-oriented advertisements; a negative value is input if it is not desired to watch child-oriented advertisements; a value close to zero is input if it does not matter (see FIG. 6).

TABLE 1

| OPT_ID | OPT_KB | OPT_NM |
| --- | --- | --- |
| A000 | 1 | Travel |
| A001 | 2 | Domestic travel |
| A0011 | 3 | Where there is the sea |
| A0012 | 3 | Where there is greenery |

TABLE 1-continued

| OPT_ID | OPT_KB | OPT_NM |
| --- | --- | --- |
| A0013 | 3 | Resort |
| A0014 | 3 | Gourmet |
| A0015 | 3 | Shopping |
| A0016 | 3 | Tour of remains |
| A0017 | 3 | Watch a game of sports |
| A0018 | 3 | Take part in sports |
| A0019 | 3 | Hot springs |
| A002 | 2 | Travel abroad |
| A0021 | 3 | Where there is the sea |
| A0022 | 3 | Where there is greenery |
| A0023 | 3 | Resort |
| A0024 | 3 | Gourmet |
| A0025 | 3 | Shopping |
| A0026 | 3 | Tour of remains |
| A0027 | 3 | Watch a game of sports |
| A0028 | 3 | Take part in sports |
| A003 | 2 | Drive-related information |
| A0031 | 3 | Dating |
| A0032 | 3 | Family drive |
| A0033 | 3 | Drive alone |
| A004 | 2 | leisure facilities |
| A005 | 2 | Travel-related services |
| B000 | 1 | Car supplies |
| B001 | 2 | Domestic cars |
| B0011 | 3 | Sedan |
| B0012 | 3 | Hard-top |
| B0013 | 3 | Hatch-back |
| B0014 | 3 | Coupe, sports car |
| B0015 | 3 | Convertible, cabriolet |
| B0016 | 3 | Station wagon |
| B0017 | 3 | Sport-utility vehicle (SUV) |
| B0018 | 3 | Recreational vehicle (RV) |
| B0019 | 3 | Minivan, one-box car |
| B002 | 2 | Imported vehicle |
| B0021 | 3 | Sedan |
| B0022 | 3 | Hard-top |
| B0023 | 3 | Hatch-back |
| B0024 | 3 | Coupe, sports car |

The subscriber OPTINOUT data are to be matched with TargetINOUT data (i.e., advertisement OPTINOUT data) and product category data.

Figure 7:
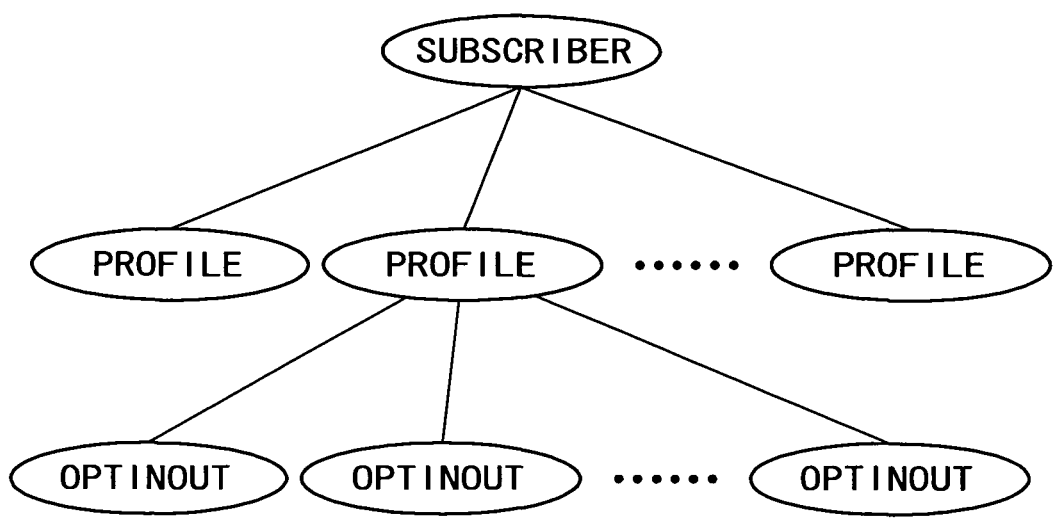
FIG. 7 is a schematic view sketching a data structure of the subscriber OPTINOUT data.

This embodiment allows each subscriber to have a plurality of profiles by preparing a plurality of sets of subscriber data for different uses or situations, such as for home use and for use at work. With regard to each profile, the subscriber may input each of the items constituting the subscriber OPTINOUT data. That means each subscriber is provided with subscriber OPTINOUT data having a data structure such as one shown in FIG. 7.

The subscriber attribute information and subscriber OPTINOUT information are input by each subscriber subscribing to the content/advertisement providing system 1. The data input is done by all subscribers through their own subscriber terminals 30.

Advertisement Attribute Information

The attribute information about each advertisement is made up of advertisement meta data, commercial sponsor category data, and product category data.

The advertisement meta data are constituted by an advertisement ID for uniquely identifying each advertisement, and the advertisement meta data are to be matched with advertisement INOUT data, i.e., content OPTINOUT information.

Figure 8:
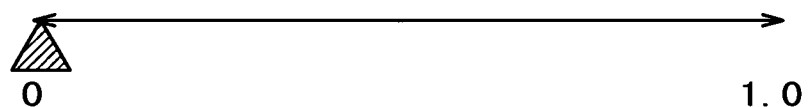
FIG. 8 is a schematic view showing how to grade in numbers an item (manufacturer A as a commercial sponsor) included in commercial sponsor category data.

The commercial sponsor category data describe the IDs of the commercial sponsors involved with the advertisement information in question. There exist what may be called joint advertisements each representing a plurality of commercial sponsors. The relevant items regarding any such advertisement are each graded in numbers ranging from 0 to 1.0 reflecting the degree of participation by each of the sponsors involved. The commercial sponsor category data are to be matched with commercial sponsor OPTINOUT data, i.e., content OPTINOUT information. FIG. 8 schematically shows how to grade in numbers an item (e.g., manufacturer A as a commercial sponsor) included in the commercial sponsor category data.

Figure 9:
FIG. 9 is a schematic view showing how to grade in numbers an item (children) included in product category data.

The product category data are made up of the items constituting the master data (M_OPT) shown in Table 1. Attribute information about each product category regarding the advertisement information in question is graded in numbers. The product category data are to be matched with product INOUT data, i.e., content OPTINOUT information. FIG. 9 schematically shows how to grade in numbers an item (children) included in the product category data.

Advertisement OPTINOUT Information

The OPTINOUT information about each advertisement is composed of content meta INOUT data, content category INOUT data, and TargetINOUT data.

Figure 10:
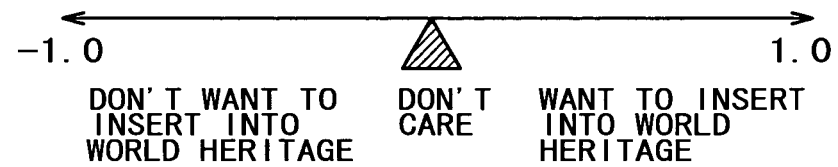
FIG. 10 is a schematic view showing how to grade in numbers an item (world heritage) included in content meta INOUT data.

The content meta INOUT data designate the requirements for the advertisement information applicable to each of the contents supplied by the content provider. Specifically, the data describe the requirements in a restricting, inhibiting, or grading manner with regard to a content ID unique to each content. If the description is of grading type, the requirements are each graded in numbers ranging from −1.0 to 1.0. FIG. 10 schematically shows how to grade a content (world heritage) in numbers. The content meta INOUT data are to be matched with the advertisement meta data (advertisement IDs).

The content category INOUT data designate the requirements (i.e., OPTINOUT) for the content categories about the advertisement information in question. The items constituting the master data in Table 2 below (M_CONTENT_CATEGORY) have their requirements described in a restricting, inhibiting, or grading manner. If the description is of grading type, each item is graded in numbers ranging from −1.0 to 1.0. Illustratively, for an item "children," a value close to 1 is input if it is desired to insert the advertisement in question into child-oriented contents; a value close to −1 is input if it is not desired to insert the advertisement into child-oriented contents; a value close to zero is input if it does not matter (see FIG. 11).

TABLE 3

| CONTENT_CAT_ID | CONTENT_CAT_NM |
|---|---|
| 1 | General contents |
| 2 | Weekly photo magazines (gossip sites) |
| 3 | Contents for male teenagers (fashion, culture) |
| 4 | Contents for young male (fashion, culture) |
| 5 | Contents for male young adults (general) |
| 6 | Contents for male young adults (fashion-related) |
| 7 | Contents for male young adults (entertainment-related) |
| 8 | Business, money, and news contents |
| 9 | News reports and documentaries |
| 10 | Interviews |
| 11 | Fashion-related contents for female teenagers |
| 12 | Entertainment-related contents for female teenagers |
| 13 | Fashion-related contents for young female |
| 14 | Entertainment-related contents for young female |
| 15 | Fashion-related contents for female young adults |
| 16 | Entertainment-related contents for female young adults |
| 17 | Career- and life-related contents for female young adults |
| 18 | Contents for young housewives |
| 19 | Contents for housewives |
| 20 | Maternity and child-rearing contents |
| 21 | Town information contents |

TABLE 3-continued

| CONTENT_CAT_ID | CONTENT_CAT_NM |
|---|---|
| 22 | Town information contents for females |
| 23 | Gadget and trend information contents |
| 24 | TV/FM information contents |
| 25 | Travel and leisure contents |
| 26 | Sports contents |
| 27 | Golf contents |
| 28 | Vehicle and motorcycle contents |
| 29 | PC-related contents |
| 30 | Literature and history contents |
| 31 | Health-related contents |
| 32 | Film and music contents |
| 33 | Building and housing information contents |
| 34 | Seminar contents |
| 35 | Animation contents |
| 36 | Popular entertainment contents |
| 37 | Creative activity contents |
| 38 | Science contents |
| 39 | Game contents |
| 40 | Educational contents |
| 41 | Pet contents |
| 42 | Gourmet contents |

The content INOUT data are to be matched with the commercial sponsor category data.

The TargetINOUT data designate the requirements (i.e., OPTINOUT) for the subscriber viewing the advertisement information in question. The items constituting the master data in Table 3 below (M_TARGET) have their requirements described in a restricting, inhibiting, or grading manner. Illustratively, for an item "children," a value close to 1 is input if it is desired to show the advertisement to the subscriber who feels more or less close to children (the closer the subscriber feels, the closer the value is to 1); a value close to −1 is input if it is desired to show the advertisement to the subscriber who feels more or less estranged from children (the more estranged the subscriber feels, the closer the value is to −1); a value close to zero is input if it does not matter (see FIG. 12).

TABLE 3

| TARGET TABLE_ID | | TABLE_NM |
|---|---|---|
| 1 | Sex | Sex |
| 2 | Age from | Age from |
| 3 | Age to | Age to |
| 4 | M_COUNTRY | Country of residence |
| 5 | M_AREA | Area of residence |
| 6 | ZIP code for area of residence | ZIP code for area of residence |
| 7 | M_COUNTRY | Country of employment |
| 8 | M_AREA | Area of employment |
| 9 | ZIP code for area of employment | ZIP code for area of employment |
| 10 | M_JOB | Profession |
| 11 | M_SALARY | Annual income for household |
| 12 | Spouse | Marital status |
| 13 | M_FAMILY | Family structure |
| 14 | M_HOUSE | Type of house |
| 15 | M-OPT | Optin information |

The TargetINOUT data are to be matched with the subscriber data (subscriber attribute information) and subscriber OPTINOUT data.

With this embodiment of the invention, each piece of advertisement information can be targeted for a plurality of subscribers. Each advertisement target may have TargetINOUT data whose items are allowed to be input. The advertisement OPTINOUT data are thus given a data structure such as one shown in FIG. 13.

Because the content/advertisement providing system 1 of this embodiment allows a single piece of advertisement information to be viewed by a plurality of subscribers simultaneously, the advertisement selecting server 40 performs matching processes on a subscriber-by-subscriber basis. The MP unit 42 (to be described later) is designed to skip advertisement targets applicable to the same advertisement information. That is, the AND relation exists between items of the OPTINOUT information established within the same advertisement target, whereas the OR relation is in effect between items of the OPTINOUT information set for different advertisement targets.

The advertisement attribute information and OPTINOUT information may be input in units of advertisements illustratively through the advertisement server 20 by the commercial sponsor distributing advertisement information by use of the content/advertisement providing system 1.

Content Attribute Information

The content attribute information is composed of content meta data and content category data.

The content meta data constitute a content ID for uniquely identifying each content, and the content meta data are to be matched with the content meta OPTINOUT data, i.e., advertisement OPTINOUT information.

The content category data designate the category of the content in question. Specifically, the data describe an attribute value for each of the items making up the master data (M_CONTENT_CATEGORY) shown in Table 2, the value being graded in numbers ranging from 0 to 1.0. Illustratively, for an item "children," a value close to 1 is input if the content is child-oriented; otherwise a value close to 0 is input (see FIG. 14). The content category data are to be matched with the content category OPTINOUT data (advertisement OPTINOUT information).

Content OPTINOUT Information

The content OPTINOUT information is made up of advertisement INOUT data (content→advertisement), commercial sponsor INOUT data (content→advertisement) and product INOUT data (content→advertisement).

Figure 15:
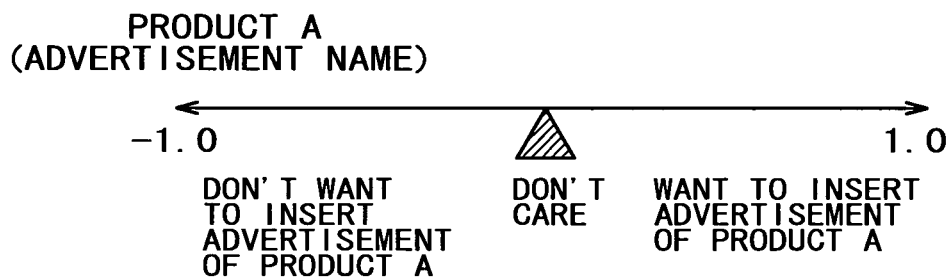
FIG. 15 is a schematic view showing how to grade in numbers an item included in advertisement INOUT data as part of content OPTINOUT information.

The advertisement INOUT data designate the requirements (OPTINOUT information) for each piece of advertisement information regarding the content in question. Specifically, the data describe, in a restricting, preferring, inhibiting, or grading manner, each of the items constituting the advertisement information provided by the advertisement server 20, i.e., advertisement meta data (advertisement IDs). If the description is of grading type, each item is graded in numbers ranging from –1.0 to 1.0. For example, a value close to 1 is input if it is desired to insert advertisement information about a product A into the content; a value close to –1 is input if it is not desired to insert the advertisement information about the product A into the content; a value close to 0 is input if it does not matter (see FIG. 15). The advertisement INOUT data are to be matched with the advertisement meta data (advertisement attribute information).

Figure 16:
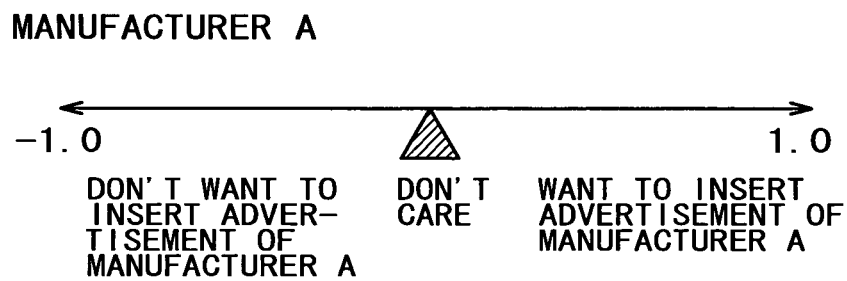
FIG. 16 is a schematic view showing how to grade in numbers an item included in commercial sponsor INOUT data as part of the content OPTINOUT information.

The advertisement INOUT data designate the requirements (OPTINOUT) for each of the commercial sponsor categories applicable to the content in question. Specifically, the data describe, in a restricting, preferring, inhibiting, or grading manner, each of the items constituting the master data (M_CUSTOMER) shown in Table 4 below. For example, a value close to 1 is input if it is desired to insert advertisement information from a manufacturer A into the content; a value close to –1 is input if it is not desired to insert the advertisement information from the manufacturer A into the content; a value close to 0 is input if it does not matter (see FIG. 16).

TABLE 4

| CONTENT_CAT_ID | CONTENT_CAT_NM |
|---|---|
| A303 | M Electric |
| A130 | M Electric Products |
| A140 | M Industries |
| J915 | T Industries |
| B070 | T Automobile |
| B050 | D Industries |
| B120 | H Giken |
| B130 | M Auto Industries |
| B380 | DC Nippon |
| B140 | Y Motor |
| A060 | S |
| D180 | F |
| F383 | DH |
| F165 | S Japan |
| F777 | B |
| F720 | Z |
| M404 | HU |
| H050 | E Pharmaceutical |
| H295 | T Pharmaceutical |
| J450 | M Cosmetics |
| J400 | S Cosmetics |
| J710 | K Chemicals |
| J160 | K Cosmetics |
| K02N | Y Shoyu |
| K10N | H Foods |
| L215 | K Distillery |
| L131 | S Winery |
| L020 | S Distillery |
| L712 | K Soft Drinks |
| L510 | A Foods |
| M576 | W Clothing |
| P398 | N Non-life Insurance |
| P210 | S Life Insurance |
| P426 | D Securities |
| P614 | Q Credit |
| P39D | A Group |
| P665 | P Finance |
| Q26J | M Clothing |
| Q21E | M Department Store |
| Q58C | B Electric Products |
| R438 | M Real Estate |
| G252 | A Industries |

The advertisement INOUT data are to be matched with the commercial sponsor category data (advertisement OPTINOUT information).

Figure 17:
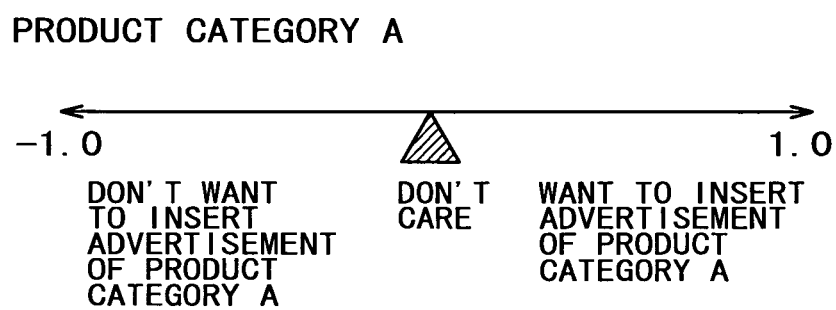
FIG. 17 is a schematic view showing how to grade in numbers an item included in product INOUT data as part of the content OPTINOUT information.

The product INOUT data designate the requirements (OPTINOUT) for each of the product categories applicable to the content in question. Specifically, the data describe, in a restricting, preferring, inhibiting, or grading manner, the requirements for each of the items constituting the master data (M_OPT) shown in Table 2. If the description is of grading type, each item is graded in numbers ranging from –1.0 to 1.0. For example, a value close to 1 is input if it is desired to insert advertisement information of a product category A into the content; a value close to –1 is input if it is not desired to insert the advertisement information of the product category A into the content; a value close to 0 is input if it does not matter (see FIG. 17). The product INOUT data are to be matched with the product category data (advertisement attribute information).

The above-described content attribute information and OPTINOUT information may be input in units of contents illustratively through the content server 10 by the content provider distributing contents by use of the content/advertisement providing system 1.

As described above, the advertisement selecting server 40 run by the advertisement selection business operator selects advertisement information to be inserted into the content requested by a given subscriber, the selection being made based on the results of the four types of matching (matching 1 through matching 4) between the attribute information held by the subscriber, advertisement information, and content on one hand, and the OPTINOUT information on the other hand.

In other words, the advertisement selecting server 40 selects the advertisement information to be inserted into the content by judging comprehensively the interests of the subscriber, commercial sponsor, and content provider through the four types of matching. The results from these four types of matching are each scored by factors "a," "b," "c" and "d" (a+b+c+d=1) so that the advertisement selection business operator's policy may be reflected in the selection of advertisement information.

In each type of matching, the scored data may be used between different items. It is also possible to set penalty values for cases where advertisements overlap.

The advertisement selecting server 40 performs matching processes using the attribute information input for each subscriber, each advertisement, and each content as well as the OPTINOUT Information. There are two cases of matching with regard to the use of information: in one case, the input attribute information and OPTINOUT information are used unmodified; in the other case, the input attribute information and OPTINOUT information are further processed by the advertisement selecting server 40 before being put to use. Table 5 below shows detailed data used by the advertisement selecting server 40 for matching purposes.

TABLE 5

| Players | Data types | Data names | | Grade in numbers | | Details |
|---|---|---|---|---|---|---|
| Subscriber (Subscriber) | Attribute (Attribute) | Subscriber data | SUB_TRGT | None (0 or 1) | $C^{(a31)}$ | Sex, date of birth, country of residence, area of residence, ZIP code for place of residence, ID for country of employment, ID for area of employment, ZIP code for area of employment, mother tongue, knowledge of foreign languages, job ID, annual income ID, marital status, residence ID, and family structure. $C^{(sa1)} = 1$ only upon matching with T_TARGET_INOUT (--> subscriber attributes). |
| | | (Subscriber OPTINOUT data) | T_OPT_INOUT | Positive side Negative side | $C^{(a32)}$ $C^{(a33)}$ | OPT category (either always takes 0) |
| | OPTINOUT (--> advertisement) | Subscriber OPTINOUT data | T_OPTINOUT | −1.0 to 1.0 | $C^{(o41)}$ | OPT category |
| Ad (advertisement information) | Attribute (Attribute) | Advertisement meta data | T_AD | None (0 or 1) | $C^{(a11)}$ | Advertisement ID only (ID for uniquely identifying advertisement). $C^{(aa1)} = 1$ only upon matching with T_IMG_INOUT. |
| | | Sponsor category data | T_ADV | 0 to 1.0 | $C^{(a12)}$ | Transaction master |
| | | Product category data | T_PRD | 0 to 1.0 | $C^{(a13)} = C^{(a41)}$ | OPT category master |
| | OPTINOUT (--> content) | Content meta OPTINOUT data | T_ADC_INOUT | −1.0 to 1.0 | $C^{(o21)}$ | ID for uniquely identifying content |
| | | Content category OPTINOUT data | T_ADCC_INOUT | −1.0 to 1.0 | $C^{(o22)}$ | Content category master |
| | OPTINOUT (--> subscriber) | TargetINOUT data | T_TRGT_INOUT | To-subscriber attribute | −1.0 to 1.0 | $C^{(o31)}$ | Sex, age from, age to, country of residence, area of residence, ZIP code for place of residence, ID for country of employment, ID for area of employment, ZIP code for area of employment, mother tongue, knowledge of foreign languages, job ID, annual income ID, marital status, residence ID, and family structure |
| | | | | To-OPT category; positive side | | $C^{(o32)}$ | OPT category (either always takes 0) |
| | | | | To-OPT category; negative side | | $C^{(o33)}$ | |
| Contents | Attribute (Attribute) | Content meta data | T_CONTENT | None (0 or 1) | $C^{(a21)}$ | Content ID only (ID for uniquely identifying content). $C^{(ca1)} = 1$ only upon matching with T_TDC_INOUT. |
| | | Content category data | T_CONT_CAT | 0 to 1.0 | $C^{(a22)}$ | Opt category master |
| | OPTINOUT (--> subscriber) | Advertisement INOUT data | T_IMG_INOUT | −1.0 to 1.0 | $C^{(o11)}$ | ID for uniquely identifying advertisement information |
| | | Sponsor INOUT data | T_ADV_INOUT | −1.0 to 1.0 | $C^{(o12)}$ | Transaction master |

TABLE 5-continued

Figure 6:
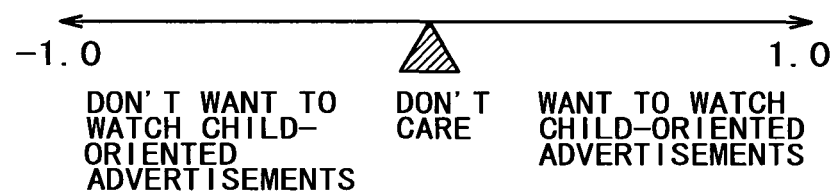
FIG. 6 is an explanatory view picturing how to input subscriber OPTINOUT data (graded in numbers)

| Players | Data types | Data names | | Grade in numbers | | Details |
|---|---|---|---|---|---|---|
| | | Product INOUT data | T_PRD_INOUT | −1.0 to 1.0 | $C^{(o13)}$ | OPT category master |
| Advertisement selection business operator (Dad) | Business operator's policy | Scoring between different types of matching | | 0 to 1.0 | $C^{(p1)}$ | Score used in four types of matching are determined. |
| | | Scoring between different categories | | 0 to 1.0 | $C^{(p2)}$ | Score between categories (large, medium, small) are determined for each OPTINOUT data item having a category. |

Where the subscriber attribute information is concerned, the attribute data and OPTINOUT data representing the subscriber's taste are generated from the same subscriber's OPTINOUT data at the time of matching. Where the subscriber OPTINOUT information is to be handled as the subscriber attribute data, the OPTINOUT data are divided into the positive and the negative sides as shown in FIG. 6, so that the positive-side data and negative-side data are treated as attribute values as indicated in FIGS. 18 and 19. In such cases, at least either the positive or the negative side takes the value of zero.

Figure 20:
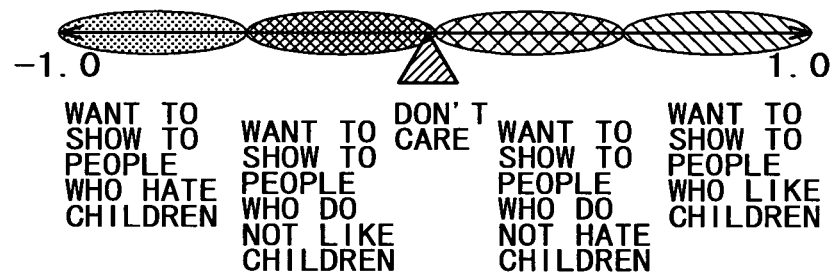
FIG. 20 is a schematic view explaining how the OPTINOUT data for the subscriber, shown in FIG. 12, are divided into a plurality of portions for use.
Figure 21:
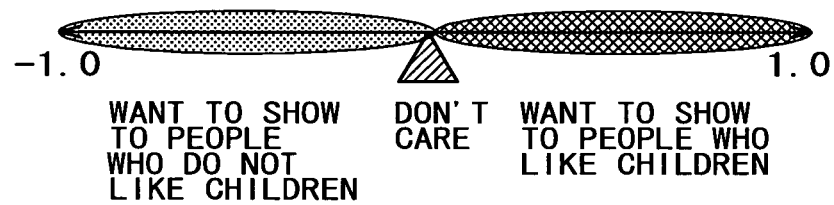
FIG. 21 is another schematic view explaining how the OPTINOUT data for the subscriber in FIG. 12 are divided into a plurality of portions for use.
Figure 22:
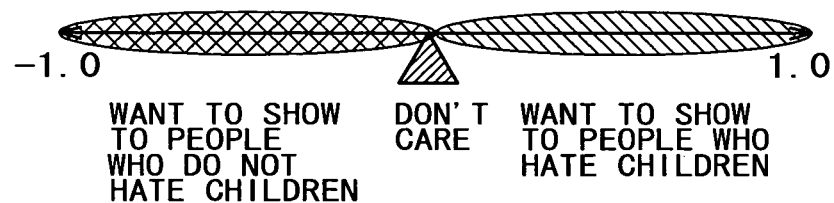
FIG. 22 is still another schematic view explaining how the OPTINOUT data for the subscriber in FIG. 12 are divided into a plurality of portions for use.

The subscriber OPTINOUT information may be used as input at the time of matching. The advertisement OPTINOUT information may also be used as input upon matching.

Where the advertisement OPTINOUT information is concerned, the positive-side and negative-side TargetINOUT data are generated out of the TargetINOUT data applicable to the OPT category item at the time of matching. For example, the subscriber OPTINOUT data shown in FIG. 12 may be divided into a plurality of portions as indicated in FIG. 20, and then reconstituted into two kinds of OPTINOUT data depicted in FIGS. 21 and 22. This allows the commercial sponsor to perform subscriber targeting bidirectionally: either according to the subscriber's degree of preference for a specific item, or depending on the subscriber's degree of distaste for that item. Of the input TargetINOUT data, those corresponding to the subscriber attribute items are used unmodified at the time of matching.

The content-related attribute information and OPTINOUT information are used as input at the time of matching.

D. Extraction of Candidate Advertisements by Rule Unit

Figure 23:
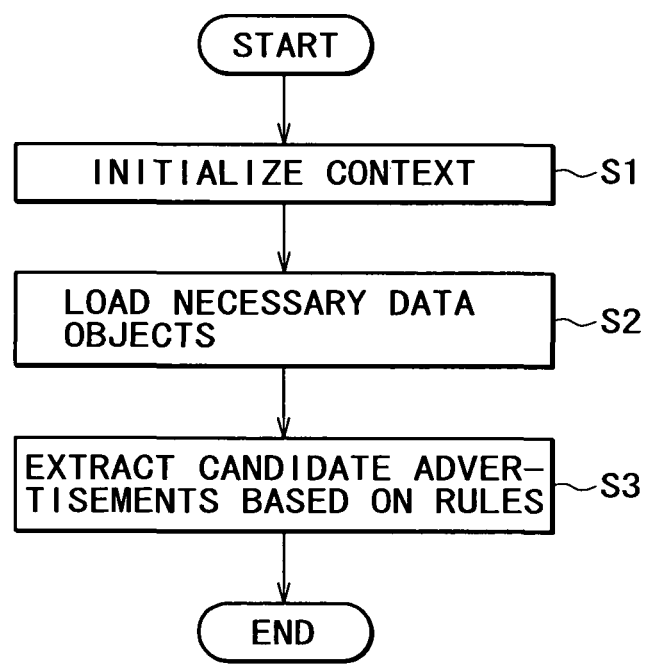
FIG. 23 is a flowchart of steps carried out by a rule unit 41 of the advertisement selecting server 40.

Described below with reference to the flowchart of FIG. 23 are the steps carried out by the rule unit 41 of the advertisement selecting server 40 to extract candidates of advertisement information (candidate advertisements) to be inserted into the content requested by a subscriber.

In step S1, AdSelectRules.java is booted to initialize the context.

In step S2, data objects needed for the subscriber, advertisement information, and content are loaded. The data objects here refer to attribute information and OPTINOUT information input or processed with regard to the subscriber, advertisement information, and content.

In step S3, AdSelectRules.java and AdSelect.ilr are carried out to extract candidate advertisements according to rules.

Figure 24:
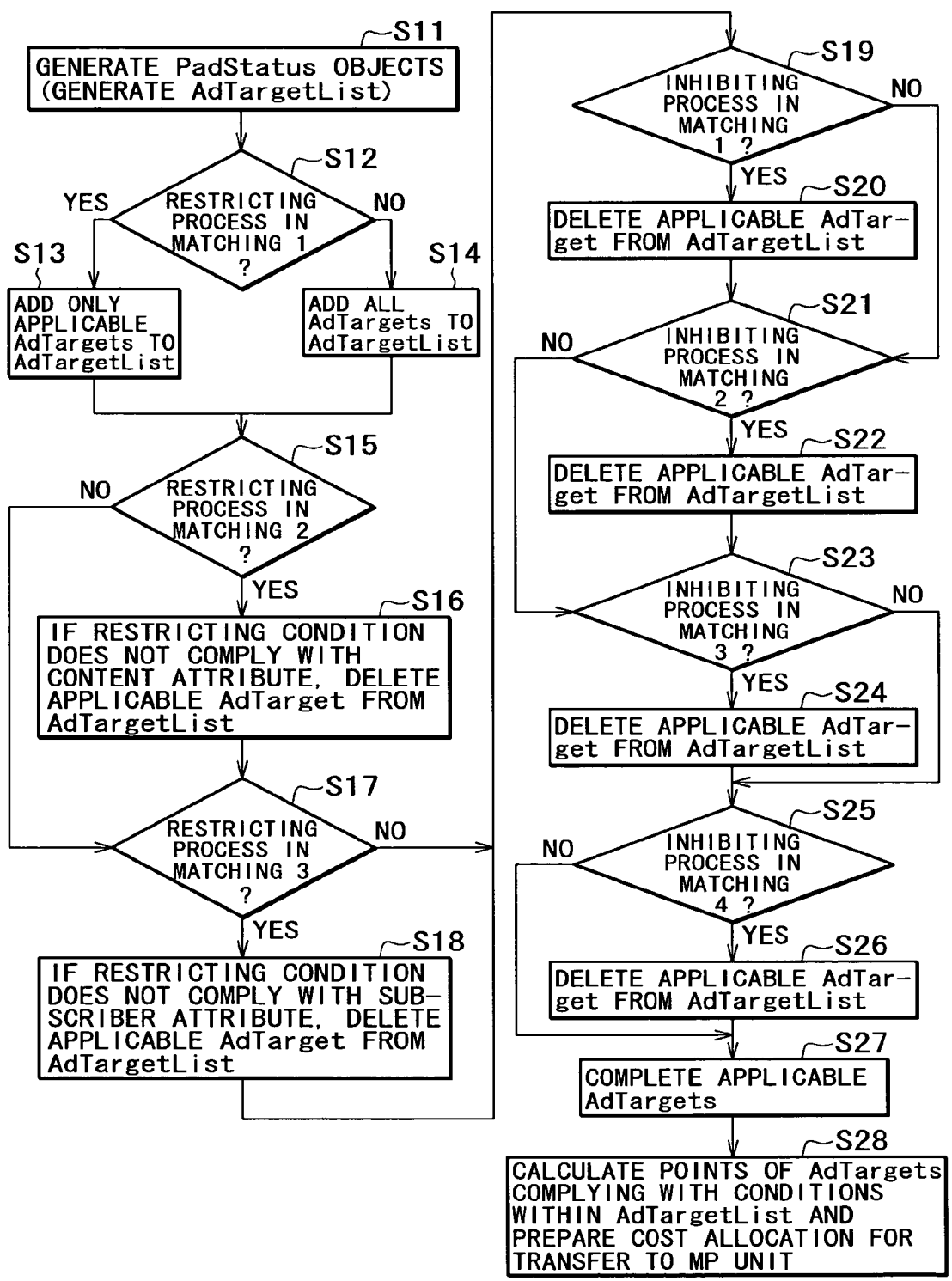
FIG. 24 is a flowchart of detailed steps for extracting candidate advertisements based on rules.

FIG. 24 is a flowchart of detailed steps performed by the rule unit 41 to extract candidate advertisements based on predetermined rules. In step S11, initialization is effected preparatory to extracting candidate advertisements. Specifically, PadStatus objects are generated so as to prepare AdList (a list of candidate advertisements) and AdTargetList (a list of candidate advertisement targets).

If there exist any rules over the contract of advertisement exposure, they need to be applied here. For example, if a specific day of the week or a specific time zone of the day is designated for the advertisement information, only those advertisements meeting the requirement are left as candidates in AdList.

In step S12, the restricting process of matching 1 is performed. More specifically, if there exist restricted advertisements applicable to matching 1, the applicable AdTargets alone are added to AdTargetList in step S13. If there are no such advertisements, all AdTargets are added to AdTargetList in step S14.

In any type of matching, it should be noted, any object to be compared is effective only if its attribute has a value larger than zero.

In step S15, the restricting process of matching 2 is performed. If there exist restricted advertisements applicable to matching 2 and the restricting condition does not comply with the content attribute, the applicable AdTargets are deleted from AdTargetList in step S16.

In step S17, the restricting process of matching 3 is carried out. If there exist restricted advertisements applicable to matching 3 and the restricting condition does not comply with the subscriber attribute, the applicable AdTargets are deleted from AdTargetList in step S18.

In step S19, the inhibiting process of matching 1 is performed. If there exist inhibited advertisements applicable to matching 1, the applicable AdTargets are deleted from AdTargetList in step S20.

In step S21, the inhibiting process of matching 2 is performed. If there exist inhibited advertisements applicable to matching 2, the applicable AdTargets are deleted from AdTargetList in step S22.

In step S23, the inhibiting process of matching 3 is carried out. If there exist inhibited advertisements applicable to matching 3, the applicable AdTargets are deleted from AdTargetList in step S24.

In step S25, the inhibiting process of matching 3 is carried out. If there exist inhibited advertisements applicable to matching 4, the applicable AdTargets are deleted from AdTargetList in step S26.

Following the restricting and inhibiting processes in the different types of matching, AdTargetList is completed in step S27.

With this embodiment, the items set as restricting type are verified before the items set as inhibiting type. The staggering arrangement reduces the number of processes to be carried out to extract candidate advertisements.

In step S28, cost allocation is prepared by calculating points of AdTargets by grading in numbers each of those AdTargets in AdTargetList which comply with the conditions involved. The cost allocation thus prepared is transferred to the MP unit 42 located downstream.

In the cost allocation, when OPTINOUT data, wherein the grade and the restricting condition in any type of matching is set, comply with the attribute to be compared with, respectively, the cost of the AdTarget of the matching is calculated, and added to the cost allocation.

In this context, the score for the i-th AdTarget is expressed as follows:

k=number of items
r=number of items such that $(C_k^{(oxy)} \times C_k^{(axy)})$ will not become zero (calculations are made with r=1 for BL2.)
if $r \neq 0$ $$costMxy^{(i)} = \frac{\sum_k (C_k^{(oxy)} \times C_k^{(axy)})}{r}$$

if r=0
    $costMxy^{(i)}=0$

For this embodiment of the invention, the grade of any item furnished with a restricting condition is taken as 1.0.

Table 6 below shows typical relations between the different types of matching on one hand and the cost allocation on the other hand.

TABLE 6

| Matching | Sub Matching | Object to be compared OPTINOUT | Attribute | Cost for AdTarget$^{(i)}$ | | Scoring between matching types |
|---|---|---|---|---|---|---|
| M1 | M11 | $C^{(o11)}$ | $c^{(a11)}$ | Cost M11$^{(i)}$ | costM1$^{(i)}$ | $C^{(p1)}$ [1] |
|  | M12 | $C^{(o12)}$ | $C^{(a12)}$ | Cost M12$^{(i)}$ |  |  |
|  | M13 | $C^{(o13)}$ | $c^{(a13)}$ | Cost M13$^{(i)}$ |  |  |
| M2 | M21 | $C^{(o21)}$ | $C^{(a21)}$ | Cost M21$^{(i)}$ | costM2$^{(i)}$ | $C^{(p1)}$ [2] |
|  | M22 | $C^{(o22)}$ | $C^{(a22)}$ | Cost M22$^{(i)}$ |  |  |
| M3 | M31 | $C^{(o31)}$ | $C^{(a31)}$ | Cost M31$^{(i)}$ | costM3$^{(i)}$ | $C^{(p1)}$ [3] |
|  | M32 | $C^{(o32)}$ | $C^{(a32)}$ | Cost M32$^{(i)}$ |  |  |
|  | M33 | $C^{(o33)}$ | $C^{(a33)}$ | Cost M33$^{(i)}$ |  |  |
| M4 |  | $C^{(o41)}$ | $C^{(a41)}$ |  | costM4$^{(i)}$ | $C^{(p1)}$ [4] |

Based on the obtained cost for sub-matching types, the cost of each type of matching is given by the following expression:

$$costMx^{(i)} = \frac{\sum_{y=1}^{m} costMxy^{(i)}}{m}$$

(where, m=sub-matching count for Mx)

The policy of the advertisement selection business operator is reflected in the acquired cost for each type of matching. Where parameters for changing the score for matching are considered, the score for the i-th AdTarget is given by the following expression:

$$cost^{(i)} = \sum_{x=1}^{4} (C^{(p1)}[x] \times costMx^{(i)})$$

From this, the cost allocation is given as:
    Cost=[cost$^{(1)}$, cost$^{(2)}$, . . . , cost$^{(n)}$] (n=number of loaded advertisements)

E. Selection of Advertisements and Control Over Advertisement Exposure by Advertisement Selection Server When the subscriber selects the content, the advertisement selecting server 40 can select an appropriate advertisement from an advertisement information group held in the advertisement server 20, the selection being made by adjusting the interests of four players: the subscriber, content provider, commercial sponsor, and advertisement selection business operator. More specifically, the attribute information held by each of the subscriber, content provider, and commercial sponsor is compared with the requirements for the other players involved for cost calculation. The interests of the three players are taken into account in selecting advertisement information so that the benefit for the content/advertisement providing system 1 as a whole is maximized and no single player is favored disproportionately.

Control over exposure of advertisement information is quite important from the viewpoint of adjusting the inventory of advertisement information. However, this process is not indispensable in selecting the advertisement information to be inserted into slots of contents.

As mentioned above, the content provider, commercial sponsor, and subscriber possess their own attribute information and are each furnished with the guidelines for advertisement selection or the selection guidelines (OPTINOUT information) describing requirements, or both.

The attribute information and OPTINOUT information are each made up of a plurality of items. The advertisement selecting server 40 compares the same items between the attribute information for one player and the OPTINOUT data for another player, in order to determine the degree of matching therebetween with respect to advertisement selection. The results of the matching processes are judged comprehensively before selecting advertisement information candidates (i.e., candidate advertisements) to be used along with the content.

The attribute information constitutes data representing the attributes of contents, advertisements, and subscribers. The attribute information is made up of a plurality of items (to be described later) each graded in numbers ranging from 0 to 1.0. For any attribute data item that has only two alternatives (e.g., sex), a number 1 is given for matching and zero for mismatching.

The OPTINOUT data represent the guidelines or requirements regarding the selection of a given advertisement. In order to define the selection guidelines, the OPTINOUT data are constituted by a plurality of items provided as master data. Each of the items is given an attribute value defined as one of four types: restricting, preferring, inhibiting, or grading. Where the OPTINOUT data are defined as grading type, the items making up the data are each graded in numbers ranging from −1.0 to 1.0.

The advertisement selecting server 40 selects advertisement information based on the results of matching between attribute information and OPTINOUT data. For the content/advertisement providing system 1 of this embodiment, there are four major types of matching (see FIG. 5):

Matching 1 (M1): compares advertisement attributes with content OPTINOUT data.

Matching 2 (M2): compares content attributes with advertisement OPTINOUT data.

Matching 3 (M3): compares subscriber attributes and subscriber OPTINOUT data, with advertisement OPTINOUT data.

Matching 4 (M4): compares advertisement attributes with subscriber OPTINOUT data.

As shown in FIG. 5, part of matching 3 involves comparing advertisement OPTINOUT data with subscriber OPTINOUT data. In fact, the actual process considers the subscriber OPTINOUT data to be part of the subscriber attributes.

The four types of matching yield cost allocation for each type. The allocated cost components are scored to reflect the advertisement selection business operator's policy (using the formula below), whereby a definitive cost allocation is generated for a candidate advertisement:

$$Cost = a \times M1 + b \times M2 + c \times M3 + d \times M4$$

(where, $a+b+c+d=1$)

Obviously, it is also possible for the advertisement selecting server 40 to bill any given commercial sponsor for advertising fees in proportion to the number of times the applicable advertisement information has been selected (or exposed to subscribers).

Where advertisements for exposure to subscribers are to be selected, the advertisement selecting server 40 of this embodiment may include in the selection criteria some factors that reflect the past results of exposure of each advertisement. Inclusion of the factors into the selection criteria permits advertisement exposure control whereby the inventory of advertisements is taken into account.

In general, the effect of an advertisement increases in proportion to the frequency with which the advertisement is exposed. Conventionally, if subscribers of a specific profile biased to certain tastes and preferences gain access to advertisement-carrying contents, only the first-ranked advertisement, i.e., information deemed most applicable to the subscriber profile or preferences, is repeatedly exposed and the advertisements ranked in second and subsequent places tend to be slow in getting exposed. This phenomenon thwarts the commercial sponsor's intention to expose as much advertisement information as planned, which can detract from the values and functionality of the advertisement selection business operator as viable advertising media.

That disadvantage is circumvented by the inventive advertisement selecting server 40 causing the past results of advertisement-by-advertisement exposure to be taken as significant factors into the criteria for advertisement selection. This enables exposure control in accordance with the advertisement inventory.

FIG. 29 schematically illustrates a functional structure of an advertisement exposure control system implemented on the advertisement selecting server 40 according to the invention. This exposure control system includes four steps of: narrowing down advertisement candidates based on rules, calculating selection priority for advertisements, reflecting past results of advertisement exposure in selection criteria, and optimizing assignment of advertisements into slots.

(1) Narrowing Down Advertisement Candidates Based on Rules

The system extracts as candidates only those advertisements that satisfy all inhibiting and restricting conditions specific to the advertisement, content, and subscriber involved.

(2) Calculating Selection Priority for Advertisements (Ranking, Matching)

The system prioritizes individual advertisements by calculating the degrees of matching (i.e., selection priorities) between the advertisement, content, and subscriber involved.

(3) Reflecting Past Results of Advertisement Exposure in Selection Criteria

Depending on the past results of advertisement exposure, the system processes the selection priorities for individual advertisements so that the higher the frequency of past exposure, the lower the selection priority set for the advertisement in question. This step helps adjust the inventory of advertisements.

As a parameter (factor) for inventory adjustment, an exposure count quota per day (or for a predetermined period) may be added to the past results of advertisement exposure. The quota represents the number of times a given advertisement is to be exposed during the day (or during the predetermined period), determined in keeping with an estimated exposure count derived from the contract of advertisement exposure over a specific period.

The exposure quota may be determined or calculated by taking into account two kinds of factors, static and dynamic, which can trigger an increase or a decrease in viewership. The static factors are factors known in advance, such as days of the week and holidays (festival days, consecutive holidays, etc.). These factors are taken into consideration in predicting the ebb and flow of viewership and in determining the quota accordingly.

The dynamic factors are factors which occur irregularly or are difficult to predict in incidence, such as man-made events (e.g., entertainments including concerts, e-mail magazines sent to subscribers, disclosure of new contents) and natural phenomena. The factors are taken into account in predicting the increase and decrease in viewership and in determining the quota accordingly.

The results of advertisement exposure are updated in real time by the system.

(4) Optimizing Assignment of Advertisements into Slots

The system optimizes assignment of advertisements to be inserted into slots on the basis of the priorities specific to the advertisements.

Figure 30:
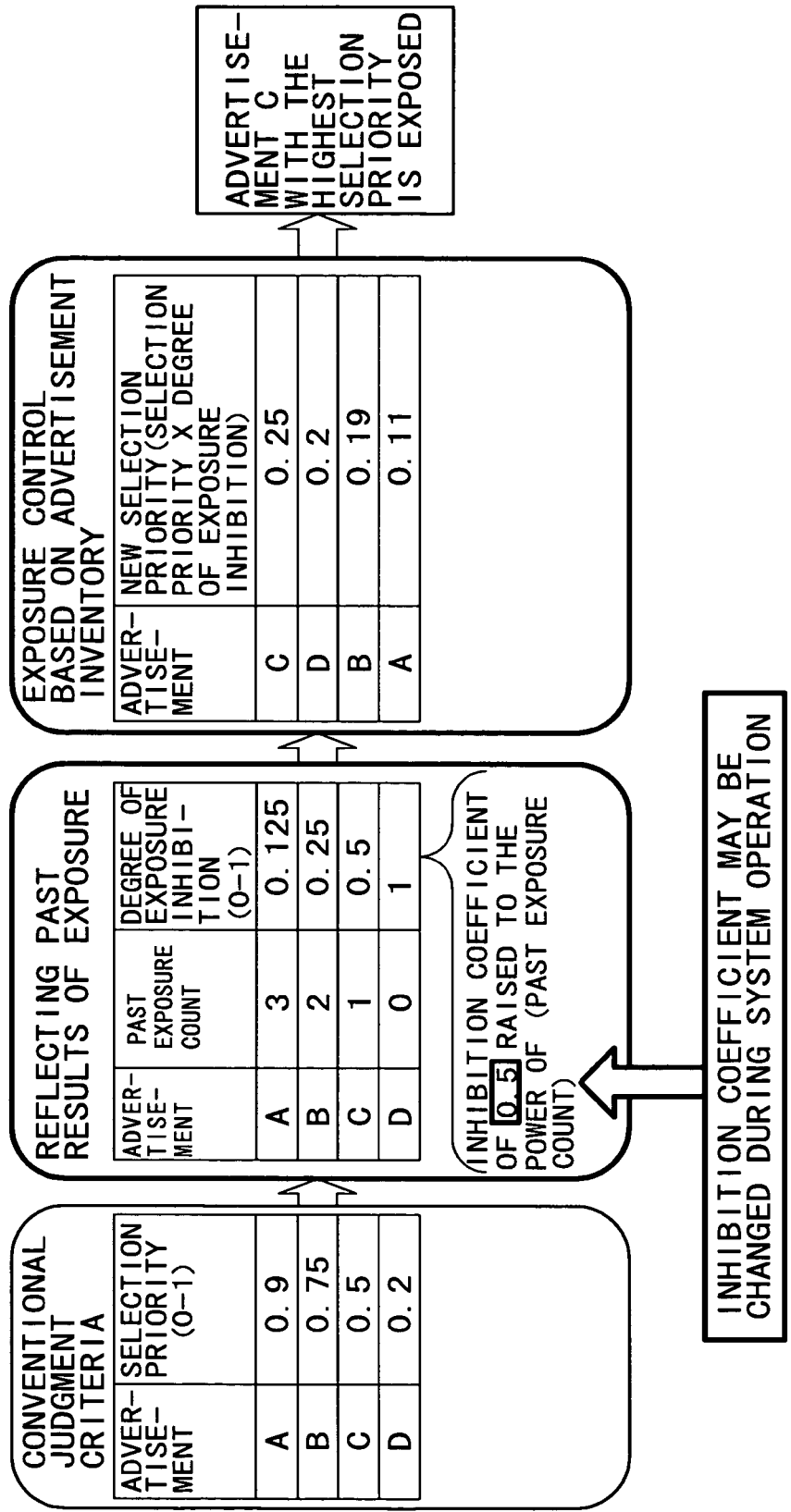
FIG. 30 is a schematic view showing a scheme under which the advertisement selecting server 40 of the invention performs advertisement exposure control by taking an inventory of advertisements into account.

FIG. 30 shows a scheme under which the inventive advertisement selecting server 40 performs advertisement exposure control by taking the inventory of advertisements into account.

According to conventional judgment criteria for advertisement selection, as shown in FIG. 30, an advertisement A with the highest selection priority (P) is selected inevitably. For example, once the cost (i.e., selection priority P) of the advertisement A is maximized as a result of matching in terms of attribute information and OPTINOUT information between the players involved, only the advertisement A with the highest cost is selected repeatedly at the expense of an advertisement B with the second-highest cost and other advertisements of lower ranks in cost. In that case, the advertisement inventory except for the top-ranked advertisement tends to be slow in getting exposed.

By contrast, the advertisement selecting method shown in FIG. 30 involves calculating degrees of exposure inhibition (I) reflecting the past results of exposure regarding individual advertisements (i.e., past exposure count C). A score relevant to the degree of exposure inhibition (I) is added to the selection priority of each piece of advertisement information.

The control scheme in FIG. 30 is intended to select the advertisement information (AI) having the highest selection priority (P) that is obtained again when the selection priority (P) based on conventional judgment criteria is multiplied by a corresponding degree of exposure inhibition (i.e. AI=P×I). The degree of exposure inhibition (I) is derived from a predetermined inhibition coefficient (D) being raised to the power of a past advertisement exposure count (C) of the advertisement in question (i.e. I=$D^C$). However, this technique of calculating the degree of exposure inhibition (I) is not limitative of the invention, and any other suitable techniques may be used as long as they embrace factors reflecting the past results of exposure.

The degree of exposure inhibition (I) for an advertisement that has never been exposed is defined as 1, which is the largest value. The greater the past advertisement exposure count (C), the closer the degree of exposure inhibition (I) to zero. Thus if there exist a plurality of advertisements having the same selection priority (P) based on conventional judgment criteria, advertisements with smaller past exposure counts are more likely to be exposed because their newly calculated selection priorities (P) are higher.

Under advertisement exposure control based on the past results of exposure, as shown in FIG. 30, advertisements which are applicable to the target but which have second-ranked or lower priorities are more likely to be exposed. The inventory of advertisements is thus exposed in an averaged manner. For example, an advertisement C having been exposed only once can be set for more frequent exposure from now on.

The exposure inhibition coefficient (I) can be modified while the content/advertisement providing system 1 is still in operation. This makes it possible to adjust a gap between the selection priorities (P) based on conventional judgment criteria on one hand, and the newly calculated selection criteria on the other hand, in keeping with how the group of advertisements selected as candidates through matching (discussed above) is organized.

Figure 31:
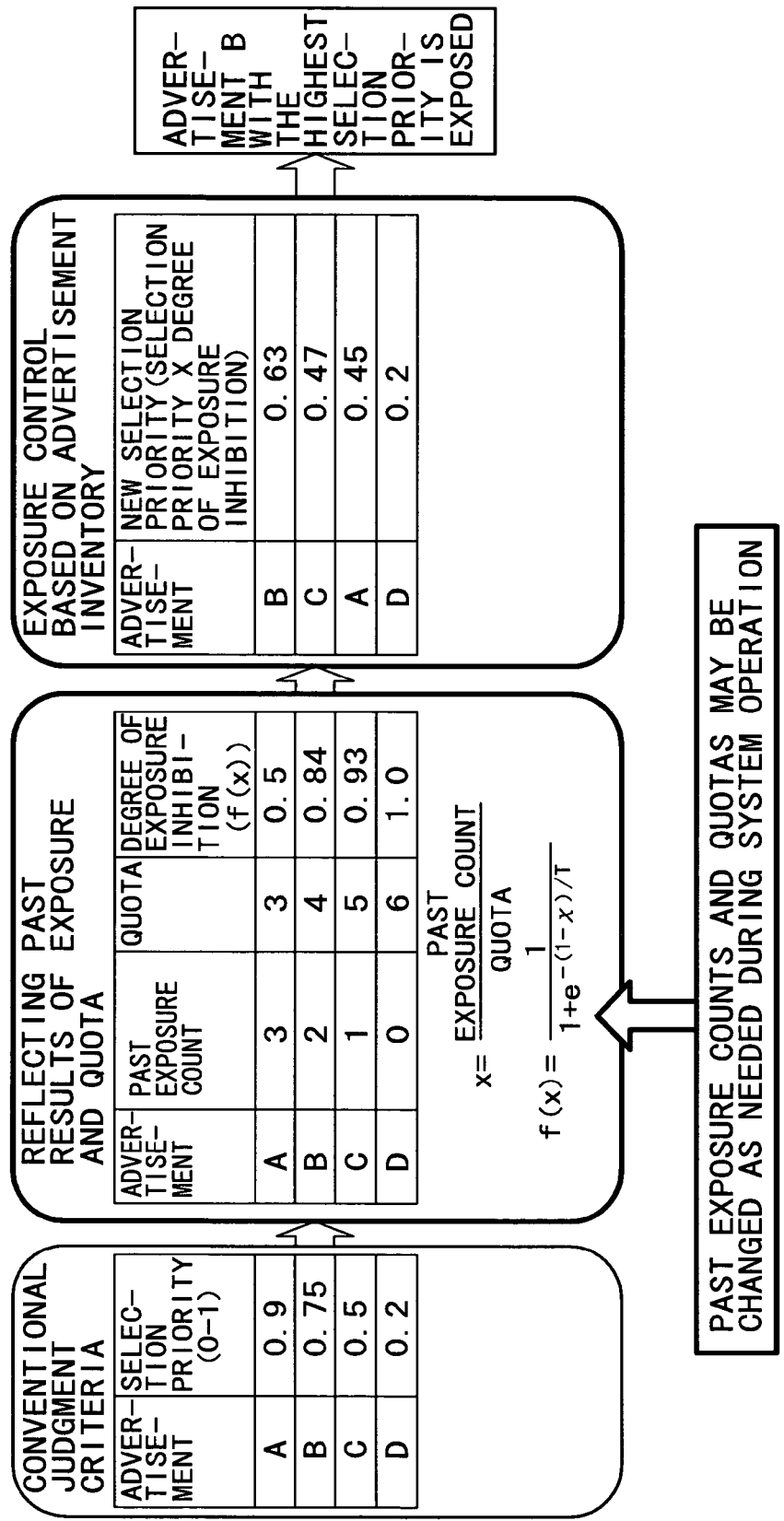
FIG. 31 is a schematic view indicating another scheme under which the advertisement selecting server 40 of the invention performs advertisement exposure control reflecting the inventory of advertisements.

FIG. 31 is a tabular view indicating another scheme under which the inventive advertisement selecting server 40 performs advertisement exposure control reflecting the inventory of advertisements.

In the example of FIG. 30, the degree of exposure inhibition is calculated in accordance with the past exposure count so that the past results of exposure of individual advertisements may be reflected. A score corresponding to the calculated degree of exposure inhibition is then added to the selection priority of each advertisement. In the example of FIG. 31, by contrast, the advertisement information to be exposed to the subscriber may be selected by taking into account not only the past results of advertisement exposure but also an exposure count quota imposed on each of the individual advertisements involved.

More specifically, the advertisement information to be exposed to the subscriber may be selected by inhibiting the selection priority of each of the individual advertisements in keeping with an increase of a quota attainment quotient "x" obtained by dividing the results of the past exposure by an exposure count quota imposed on each of the individual advertisements.

Illustratively, the exposure count quota may be calculated for a certain period (e.g., one day) based on the term of an advertisement exposure contract and on the number of times the advertisement in question is expected to be exposed during the contract period. The quota is updated periodically (e.g., every day). Calculation of the quota may take into account such factors affecting the viewing count (exposure count) as days of the week, holidays, festival days, and consecutive holidays.

Figure 32:
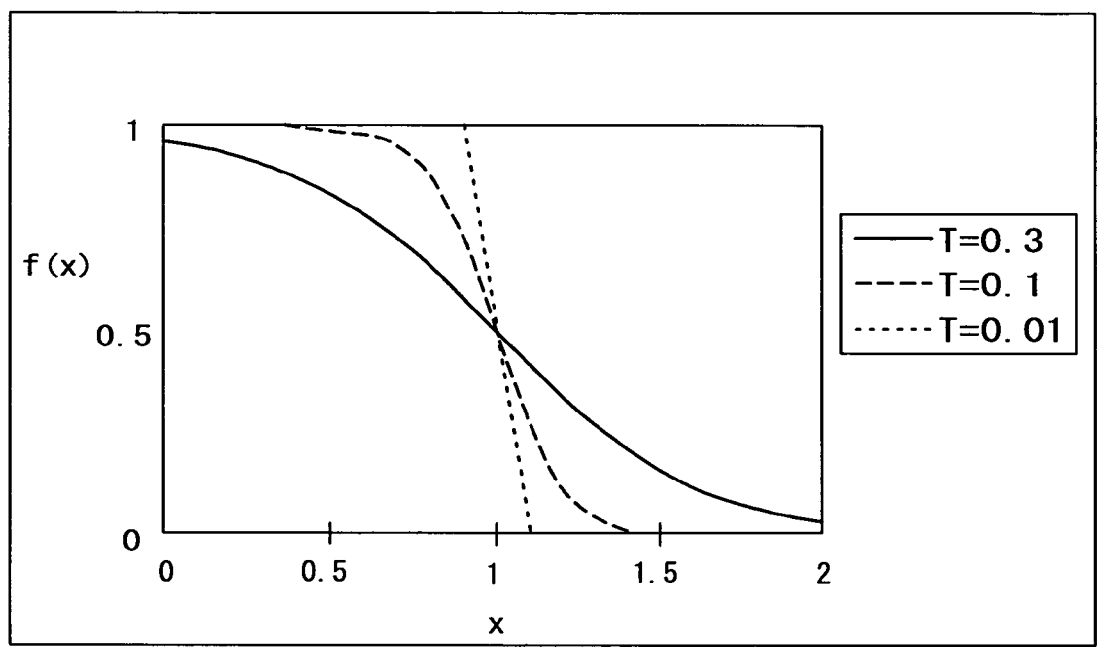
FIG. 32 is a graphic representation depicting characteristics of a function f(x) for acquiring a degree of exposure inhibition for individual pieces of advertisement information based on a quota attainment quotient "x"

A function f(x) indicated below is one which acquires the degree of exposure inhibition for a given piece of advertisement information based on a quota attainment quotient "x," i.e., the value derived from the past result of exposure of the advertisement in question and from the quota on that advertisement. Preferably, the function f(x) may be a decreasing function with regard to the variable "x" as shown below (see FIG. 32):

$$x = \frac{\text{past\_exposure\_count}}{\text{quota}}$$

$$f(x) = \frac{1}{1 + e^{-(1-x)/T}}$$

Figure 33:
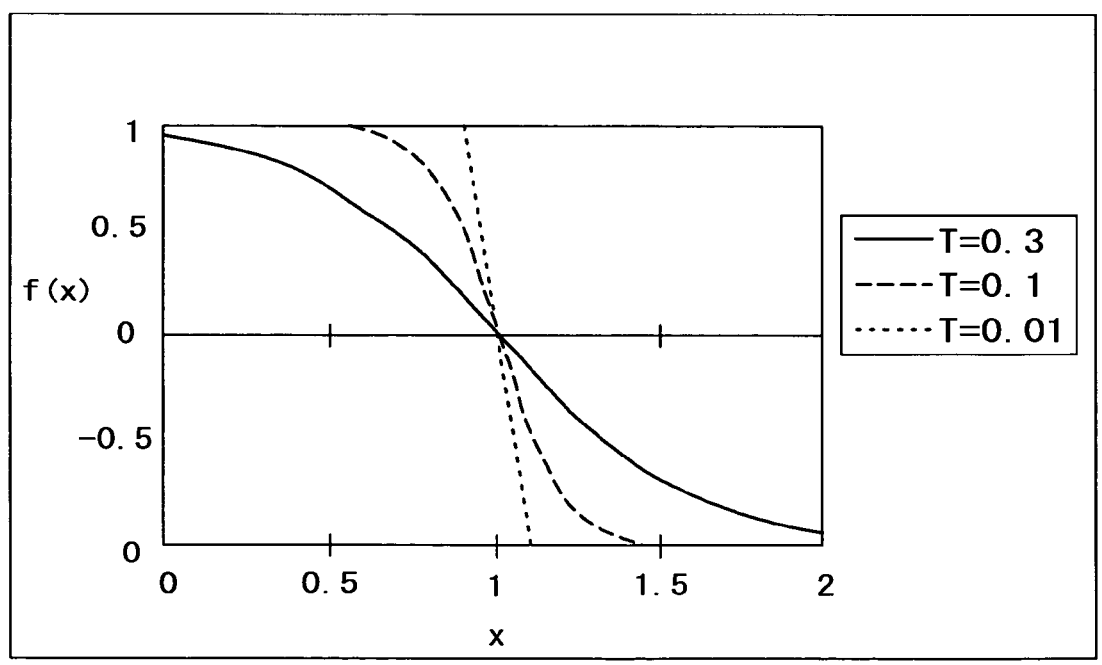
FIG. 33 is another graphic representation picturing characteristics of the function f(x) for acquiring the degree of exposure inhibition for individual pieces of advertisement information based on the quota attainment quotient "x"

The function f(x) for acquiring the degree of exposure inhibition may be varied in its characteristic with the coordinate axes shifted as described below (see FIGS. 33 and 34):

$$f(x) = \frac{2}{1 + e^{-(1-x)/T}} - 1$$

$$f(x) = \frac{1}{1 + e^{-(c-x)/T}}$$

Without recourse to a function, a table such as one below may alternatively be created to determine degrees of exposure inhibition corresponding to quota attainment quotients:

| | Quota attainment quotient (past exposure count/quota) | | | | | | | | | | |
|---|---|---|---|---|---|---|---|---|---|---|---|
| | 0.0 | 0.1 | 0.2 | 0.3 | 0.4 | 0.5 | 0.6 | 0.7 | 0.8 | 0.9 | 1.0 |
| Degree of exposure inhibition | 1.0 | 1.0 | 1.0 | 0.9 | 0.8 | 0.7 | 0.6 | 0.5 | 0.4 | 0.2 | 0.0 |

After a degree of exposure inhibition is obtained, a new selection priority for the advertisement in question is calculated by multiplying the old selection priority by the acquired degree of exposure inhibition. Since, the lower the selection priority is made, the higher the quota attainment quotient for a given advertisement is, the advertisements with less quota attainment quotients are more likely to be given higher selection priorities. This permits adjustment of the advertisement inventory.

In its simplest form, the formula for calculating the advertisement exposure quota is defined as follows:

$$\text{quota} = \frac{\text{remaining\_No\_of\_times\_advertisement\_is\_expected\_to\_be\_exposed}}{\text{remaining\_contract\_period}}$$

where, the remaining number of times the advertisement in question is expected to be exposed is obtained by subtracting the past exposure count from the total number of times the advertisement is expected to be exposed during the contract period. If the different days of the week are to be considered, the remaining expected exposure count is evenly apportioned over the remaining number of weeks under contract. For each remaining week, the apportioned exposure count is adjustably divided based on what may be called daily allocation ratios, before being assigned to each of the days constituting the week. The daily allocation ratio refers to a ratio of quota to be allocated to each day of the week. Below is a table showing seven days of the week amounting illustratively to 1.0.

| Mon. | Tue. | Wed. | Thu. | Fri. | Sat. | Sun. |
|------|------|------|------|------|------|------|
| 0.1  | 0.1  | 0.1  | 0.1  | 0.2  | 0.3  | 0.1  |

For example, suppose that the remaining number of times a given advertisement is expected to be exposed is 100, the remaining contract period is 10 days, and the day of the week for which to calculate the quota is Saturday. In that case, the remaining number of weeks is given as:

$$\frac{\text{remaining\_No\_of\_days\_under\_contract}}{7} = \frac{10}{7} = 1.43$$

That is, the remaining contract period is one week and three days. Because the fractional number represents three days and the target day of the week is Saturday, the fractional remaining number of weeks is interpreted as the three days starting on Saturday with their specific daily allocation ratios added up:

Remaining No. of weeks=1+0.3+0.1+0.1=1.5

$$\text{Quota} = \frac{\text{remaining\_expected\_exposure\_count}}{\text{remaining\_No\_of\_weeks}} \times$$

$$\text{totaled daily allocation ratio} = \frac{100}{1.5} \times 0.2 = 13.3$$

When the fractional number of the above result is raised to the nearest whole number, the quota for the target day (Saturday) is calculated at 14. For a week containing consecutive holidays or an extra holiday, another daily allocation ratio table that is slightly different in listed numbers but similar in nature is utilized. The table may be expanded up to a year by arranging a plurality of daily allocation ratio tables on the calendar time base. The tables making up the yearly table should preferably be rearranged dynamically so as to cope with dynamically occurring events.

F. Assignment of Candidate Advertisements by MP Unit

The MP unit 42 assigns suitable advertisements to slots in the content based on the costs of individual advertisements transferred from the rule unit 41.

Specifically, the MP unit 42 solves a two-dimensional assignment problem so as to assign a plurality of candidate advertisements to a plurality of slots in the content in such a manner that the degree of matching for each advertisement is maximized under the constraints discussed below. With this embodiment, the allocation problem is solved by 0-1 integer programming.

(1) In the system, advertisement information is handled in units of AdTargets by the system components leading up to the rule unit 41. From the MP unit 42 on, the information is reconstituted into individual advertisements for processing. If an advertisement has a plurality of AdTargets, the highest of the costs for the targets involved is regarded as the cost for the advertisement in question (alternatively, the costs may be averaged).

(2) Each slot is assigned with an advertisement that falls within a designated period of time. If the advertisement lasts less than the designated time period, the slot may be retained for a predetermined time period (e.g., up to 15 seconds).

(3) The same advertisement may be assigned a plurality of times to different slots. It should be noted, however, that any advertisement may not appear more than a predetermined number of times in the same content.

(4) A two-phase selection scheme is adopted under processing time constraints. In phase 1, a sufficient number of advertisements are selected with no overlap from all candidates under the slot time constraint. The candidate advertisements are selected in units of AdTargets, as described in paragraph (1) above. Arrangements are made so that a plurality of AdTargets belonging to the same advertisement will not overlap within the same slot.

In phase 2, a set of candidates selected in phase 1 is solved as a two-dimensional assignment problem for optimization. What needs to be considered at this point is the number of times each advertisement is allowed to be inserted in overlapping fashion in the same content handed over by use of a reach argument.

More detailed processes of the phases involved are discussed below.

Phase 1

In phase 1, a sufficient number of advertisements are selected under the slot time constraint, with no overlap within the same slot, from all candidate advertisements (discussed above) handed over from the rule unit 41. The conditions applicable to phase 1 are: information about the slot into which to insert the advertisement in the designated content, an advertisement variable array $y_i$, and a related information array.

If the length of a j-th slot in the content is represented by $\text{slotTime}_j$, the length may be expressed as follows:

$\text{slotTime}_j$=length of each slot (time)

j=0, 1, 2, , , (slot index).

For example, suppose that there are three slots in a given content, the slots having lengths of 45 seconds, 30 seconds, and 60 seconds respectively. In such a case, the lengths of these slots may be expressed as:

slotTime[0]=45, slotTime[1]=30, slotTime[2]=60.

The advertisement variable array $y_i$ and the related information array may be expressed as follows:

$Y_i \in 0$ or 1:1 for adopting a given advertisement; 0 for not adopting it $\text{CMtime}_i$=length of the advertisement (time period)

$\text{cost}_i$=score for the advertisement

For each slot, an integer programming problem made up of the following objective function and constraint function is solved:

Objective Function $$\sum_i \text{cost}_i \times y_i \to \max$$

Constraint Function $$\sum_i CMTime_i \times y_i \rightarrow slotTime_j$$

where, $y_i$ is fixed to zero for this embodiment so that any advertisement selected for a given slot will not be selected for the next slot.

The actual flow of processes for solving the integer programming problem above is shown below in the form of a pseudo-code.

```
For (j=0;j< No. of slots; j++) {
    // Set the following constraints in the model
environment of CPLEX:
```

$$\sum_i cost_i \times y_i \rightarrow max$$

$$\sum_i CMTime_i \times y_i \rightarrow slotTime_j$$

```
    // Solve the CPLEX problem.
    Cplex.solve( );
    // Set CheckFlag to 1 for the selected
advertisement (CM) .
        for (i=0; i< No. of candidate advertisements i++)
            if(y[i] ! =0) CheckFlag[i]=1
    // In order to avoid assigning the once-selected CM
    yi to the next slot;
    // Exclude this from the calculation (✗1).
        for (i=0;i< No. of candidate advertisements i++)
X[i] .setUb(0 . ) ;
    }
}
```

†1) Fixing the upper limit of $y_i$ to 0 causes the once-selected advertisement to be excluded from the calculation for the next slot. In practice, a method y[i] .setUb (0.0) is used for setting values, where y[i] denotes a special array type called IloNumVarArray used as a variable in the CPLEX calculation.

Solving the integer programming problem gives answers in a manner assigning candidate advertisements to different slots as shown below. The set of candidate advertisements obtained in phase 1 is forwarded to phase 2 where more detailed assignment problems will be solved.

Answer to slot 0
  $y_i$=0,1,1,0 . . . 0, . . . 0
Answer to slot 1
  $y_i$=1,0,0,0 . . . 1, . . . 0
Answer to slot 2
  $y_i$=0,0,0,1 . . . 0, . . . 0
  OR of the above answers provides:
    checkFlag$_i$=1,1,1,1 . . . 1, . . . 0

Phase 2

In phase 2, the set of candidate advertisements narrowed down in phase 1 is subjected to a redefinition process including the score of individual candidates for the reasons to be explained below. Definitive two-dimensional assignment problems are then solved for the slots.

One object of redefining candidate advertisements is both to let the same advertisement information be inserted repeatedly and to change score for advertisements having different lengths (illustratively, under the influence of the objective function, a 30-second slot is preferentially assigned two 15-second advertisements instead of a single 30-second advertisement). Another object of the redefinition of candidate advertisements is to deal with cases where the number of candidates in the set is smaller than the number of available slots (if, say, three slots are not filled with as many candidate advertisements, then special advertisement information provided by the advertisement selection business operator may illustratively be inserted instead).

In phase 2, the two-dimensional assignment problem is solved given the following two new conditions:

(1) Number of Times an Advertisement is Inserted Repeatedly Within the Same Content
  reach$_i$=No. of times each advertisement can be inserted (repeatable up to 5 times)
  i=0, 1, 2, . . . advertisement index (<No. of candidate advertisements)

Figure 25:
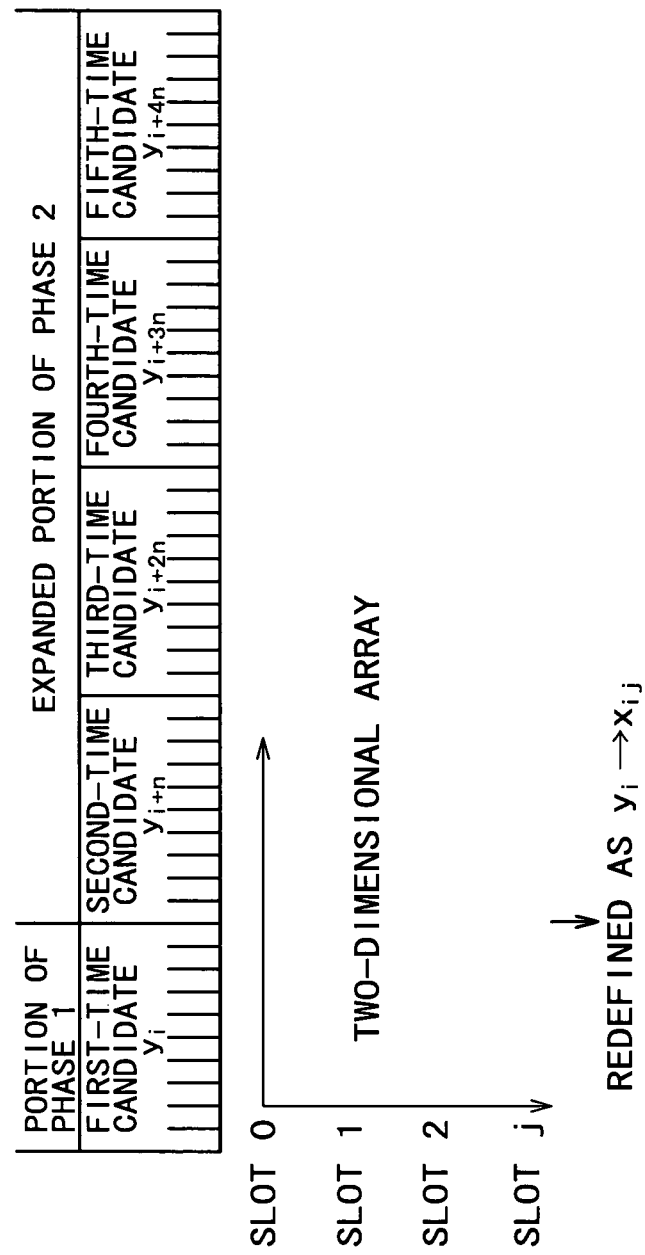
FIG. 25 is an explanatory view showing how a set of candidate advertisements selected in phase 1 is redefined while being expanded by the number of times the set is allowed to be inserted repeatedly.

(2) Expanded Candidate Advertisement Array
  $x_{ij\epsilon}$0 or 1:1 for adopting an i-th advertisement (AdTarget) in slot j; 0 for not adopting it
  CMTimePhase2$_i$=length of the advertisement (time period); expandable by up to 5 times
  costPhase2$_i$=score for the advertisement; expandable by up to 5 times
  i=0, 1, 2, . . . ; advertisement index (<No. of candidate advertisements×5)
  j=0, 1, 2, . . . ; slot number In phase 2, one advertisement (AdTarget) is scored differently so as to be handled as different advertisements over time, i.e., one for first-time use, another for second-time use, . . . , and another for fifth-time use. More specifically, for a typical redefinition process such as one shown in FIG. 25, the set of candidate advertisements selected in phase 1 is expanded by a factor of a repeatable insertion count to constitute a two-dimensional array $x_{ij}$ in conjunction with the slots available for insertion. For an expanded redefinition process such as one indicated in FIG. 26, the cost of advertisements is also expanded by a factor of the repeatable insertion count.

In phase 2, a five-fold expanded cost allocation is represented by costPhase2 in the objective function and constraint function which are redefined as follows:

$$\forall j \in SLOT \sum_{i \in CM} costPhase2_i \times x_{ij} \rightarrow max$$

$$\forall j \in SLOT \sum_{i \in CM} CMTimePhase2_i \times x_{ij} = slotTime_j \quad ※$$

Where overlapping is allowed for $\forall i \in CM$, $$\forall j \in SLOT \sum_i x_{ij} \leq 1$$

※ A transposed matrix of $x_{ji}$ of $x_{ij}$ is used to accelerate the calculation.

As a result of the processing in phase 2, it might happen that given a total of five candidate advertisements and a total of three slots, the first of advertisement candidate is inserted into slots 0 and 1, the second of advertisement candidate into slots 0 and 2, . . . , and the fifth of advertisement candidate into slot 1. In such a case, the processed result is output in a format such as one shown in FIG. 27. FIG. 28 shows a more comprehensive picture of what has taken place as the result of such processing.

Addendum

Although the description above contains much specificity, these should not be construed as limiting the scope of the invention but as merely providing illustrations of some of the presently preferred embodiments of this invention. It is evident that many alternatives, modifications and variations will become apparent to those skilled in the art in light of the description.

For example, although the description above has focused primarily on the service of distributing image contents to personal computers over the Internet, this is not limitative of the invention. Alternatively, the advertisement selecting method of this invention may also be applied to content-providing services involving mobile terminals such as mobile telephones and PDAs (personal digital assistants), as well as to bi-directional information services associated with digital TV.

As another alternative, the inventive advertisement selecting method may be applied to content-providing services involving suitable distribution means allowing packaged contents such as DVDs (digital versatile discs) to be supplemented with commercial images being offered over the Internet. In such cases, the packaged contents like the DVDs are expected to be distributed free of charge or at a low cost.

Thus the scope of the invention should be determined by the appended claims and their legal equivalents, rather than by the examples given.

INDUSTRIAL APPLICABILITY

The invention provides an advertisement selecting system, an advertisement selecting method, and a storage medium for properly selecting advertisement information to be inserted into contents that are distributed over a wide-area network such as the Internet.

The invention also provides an advertisement selecting system, an advertisement selecting method, and a storage medium for selecting, in a manner personalized for each subscriber, advertisement information used in contents that are offered to the subscribers under a pull-type distribution scheme over the Internet or similar networks.

The invention further provides an advertisement selecting system, an advertisement selecting method, and a storage medium for selectively attaching advertisement information to contents in a manner both personalized for each subscriber and better reflecting the interests of the subscriber, the commercial sponsor, and the content provider.

According to the invention, the content provider, the commercial sponsor, and the subscriber are each allowed to set items constituting the requirements (OPTINOUT) for the selection of advertisements, each item being specifiable as preferring, inhibiting, restricting, or grading type. This makes it possible for each of the parties involved to express detailed requirements regarding the selection of advertisements. Illustratively, a negative condition set as a requirement permits targeted exposure of advertisements to those who are averse to something that is designated by the condition.

According to the invention, costs of advertisements are obtained from the process of matching between the attributes held by the subscriber, commercial sponsor, and content provider on one hand, and their respective requirements on the other hand. The costs thus acquired represent in numbers the degree of satisfaction of the commercial sponsor in offering each advertisement, i.e., how appropriate each advertisement is from the sponsor's viewpoint for insertion into the content destined for a specific subscriber.

The advertisement selecting method according to the invention allows the subscriber to use selectively any one of a plurality of profiles depending on the circumstances. Illustratively, the subscriber may assume one profile at work and another at home.

The inventive advertisement selecting method allows the commercial sponsor to establish a plurality of estimated subscriber targets. The established targets enable the commercial sponsor to personalize advertisements for the sake of subscribers more precisely than before.

In addition, the advertisement selecting method of the invention allows not only the subscriber, commercial sponsor and content provider, but also the advertisement selection business operator performing the personalized advertisement selection service, to reflect their intentions in the selection of advertisements. This makes it possible for the interests of all parties involved to be taken into consideration either equitably or in a manner favoring a predetermined party or parties over the others.

The invention also provides an advertisement selecting system, an advertisement selecting method, and a storage medium for effecting inventory-based advertisement exposure control by taking into consideration the factors representative of how individual advertisements have so far been exposed to subscribers.

The invention further provides an advertisement selecting system, an advertisement selecting method, and a storage medium for effecting inventory-conscious advertisement exposure control by ensuring that the advertisement information in the inventory will not be exposed partially or in a manner favoring any specific advertisement or advertisements over the others.

When advertisements are to be selected for exposure to subscribers according to the invention, the factors representing the past result of advertisement-by-advertisement exposure are reflected in the selection judgment criteria for exposure control in keeping with the advertisement inventory. Where subscribers with a particular profile biased to specific tastes or preferences gain access to contents that carry advertisements, the first-ranked advertisement, i.e., the one best targeted for the subscribers in question, is exposed repeatedly but in a manner also making way for the advertisements in second and subsequent places which are then more likely to be exposed than if handled conventionally, so that the stocked advertisements are exposed in fairly averaged fashion. The inventive apparatus and method thus allow the commercial sponsors to schedule their advertisement exposure. As a result, the content/advertisement providing system implementing this invention may have its values significantly enhanced as viable advertising media.

The advertisement selecting apparatus and method according to the invention permit advertisement exposure control during system operation by monitoring the inventory of advertisements. This makes it more or less possible to bring about a desired peak-to-valley exposure picture during the term of the contract, which offers numerous exposure menus to the commercial sponsor under contract.

The invention claimed is:

1. An advertisement selecting apparatus for selecting advertisement information for exposure to a subscriber, said advertisement selecting apparatus comprising:

calculating unit calculating a selection priority (P) of each of said individual advertisements;

advertisement exposure result managing unit managing results of past exposure by said subscriber to individual advertisements constituting said advertisement information and calculating a past advertisement exposure count (C) of each individual advertisement;

determining unit determining a degree of exposure inhibition (I), of each of said individual advertisements, derived from a predetermined inhibition coefficient (D) being raised to a power of the past advertisement exposure count of the advertisement ($I=D^C$), the degree of exposure inhibition (I) for an advertisement that has never been exposed is defined as 1, and a greater the past advertisement exposure count (C), a closer the degree of exposure inhibition (I) is to zero, the predetermined inhibition coefficient is adjusted based on matching conditions of (a) said subscriber, (b) a content provider and (c) a commercial sponsor of advertisements; and advertisement information selecting unit obtaining a new selection priority by multiplying, from among candidate advertisements, each said selection priority by said degree of exposure inhibition (AI=P×I) and selecting the advertisement information having a highest new selection priority.

2. An advertisement selecting apparatus according to claim 1, said advertisement information selecting unit selects said advertisement information by taking into account an exposure count quota imposed on each of said individual advertisements.

3. An advertisement selecting apparatus according to claim 1, further comprising, in response to a content viewing request made by said subscriber, insertion unit inserting the advertisement information selected by said advertisement information selecting unit into a slot within contents before providing said contents to said subscriber.

4. An advertisement selecting apparatus according to claim 1, wherein, in an information-providing space involving parties made up of a content provider providing contents, of a commercial sponsor offering advertisement information to be attached to said contents, and of said subscriber, said advertisement information selecting unit compares attribute information held individually by said contents, said advertisement information, and said subscriber, with requirements held individually by said contents, said advertisement information, and said subscriber regarding the selection of advertisements, in order to acquire individual degrees of matching for said content provider, said commercial sponsor, and said subscriber, said advertisement information selecting unit further obtaining at least one candidate advertisement through calculation based on said individual degrees of matching for the parties involved, said advertisement information selecting unit further selecting the advertisement from the obtained candidate advertisements in accordance with the result of the past exposure and the selection priority regarding each of said individual advertisements.

5. An advertisement selecting apparatus according to claim 1,
said advertisement information selecting unit selects the advertisement information to be exposed to said subscriber by taking into account said selection priority of each of said individual advertisements and said results of said past exposure.

6. An advertisement selecting apparatus according to claim 1,
said advertisement information selecting unit selects the advertisement information to be exposed to said subscriber based on said selection priority of each of said individual advertisements which is multiplied by the degree of exposure inhibition derived from the predetermined inhibition coefficient being raised to the power of a past advertisement exposure count of the advertisement in question.

7. An advertisement selecting apparatus according to claim 1,
said advertisement information selecting unit selects the advertisement information to be exposed to said subscriber by taking into account said selection priority of each of said individual advertisements, said results of said past exposure, and an exposure count quota imposed on each of said individual advertisements.

8. An advertisement selecting apparatus according to claim 1,
said advertisement information selecting unit selects the advertisement information to be exposed to said subscriber by inhibiting said selection priority of each of said individual advertisements in keeping with an increase of a quota attainment quotient obtained by dividing said results of said past exposure by an exposure count quota imposed on each of said individual advertisements.

9. An advertisement selecting apparatus according to claim 1, wherein said selection priority of said advertisement information being determined based on an overall degree of matching for a system in an information-providing space involving parties made up of a content provider providing contents, a commercial sponsor offering advertisement information to be attached to said contents, and said subscriber.

10. An advertisement selecting method executed by a computer for selecting advertisement information for exposure to a subscriber, said advertisement selecting method comprising the steps of:
a calculating step for calculating a selection priority (P) of each of said individual advertisements;
a managing step for managing results of past exposure by said subscriber to individual advertisements constituting said advertisement information and calculating a past advertisement exposure count (C) of each individual advertisement;
a determining step for determining a degree of exposure inhibition (I), of each of said individual advertisements, derived from a predetermined inhibition coefficient (D) being raised to a power of the past advertisement exposure count of the advertisement ($I=D^C$), the degree of exposure inhibition (I) for an advertisement that has never been exposed is defined as 1, and a greater the past advertisement exposure count (C), a closer the degree of exposure inhibition (I) is to zero, the predetermined inhibition coefficient is adjusted based on matching conditions of (a) said subscriber, (b) a content provider and (c) a commercial sponsor of advertisements; and
a selecting step for obtaining a new selection priority for each advertisement information (AI), from among candidate advertisements, by multiplying said selection priority by said degree of exposure inhibition (AI=P×I) and selecting the advertisement information having a highest new selection priority.

11. An advertisement selecting method according to claim 10, wherein said advertisement information selecting step selects said advertisement information by taking into account an exposure count quota imposed on each of said individual advertisements.

12. An advertisement selecting method according to claim 10, further comprising the step of acting, in response to a content viewing request made by said subscriber, to insert the advertisement information selected in said advertisement information selecting step into a slot within contents before providing said contents to said subscriber.

13. An advertisement selecting method according to claim 10, wherein, in an information-providing space involving parties made up of a content provider providing contents, of a commercial sponsor offering advertisement information to be attached to said contents, and of said subscriber, said advertisement information selecting step compares attribute information held individually by said contents, said advertisement information, and said subscriber, with requirements held individually by said contents, said advertisement information, and said subscriber regarding the selection of advertisements, in order to acquire individual degrees of matching for said content provider, said commercial sponsor, and said subscriber, said advertisement information selecting step further obtaining at least one candidate advertisement through calculation based on said individual degrees of matching for the parties involved, said advertisement information selecting step further selecting the advertisement from the obtained candidate advertisements in accordance with the result of the past exposure and the selection priority regarding each of said individual advertisements.

14. An advertisement selecting method according to claim 10,
wherein said advertisement information selecting step selects the advertisement information to be exposed to said subscriber by taking into account said selection priority of each of said individual advertisements and said results of said past exposure.

15. An advertisement selecting method according to claim 10,
wherein said advertisement information selecting step selects the advertisement information to be exposed to said subscriber based on said selection priority of each of said individual advertisements which is multiplied by the degree of exposure inhibition derived from the predetermined inhibition coefficient being raised to the power of a past advertisement exposure count of the advertisement in question.

16. An advertisement selecting method according to claim 10,
wherein said advertisement information selecting step selects the advertisement information to be exposed to said subscriber by taking into account said selection priority of each of said individual advertisements, said results of said past exposure, and an exposure count quota imposed on each of said individual advertisements.

17. An advertisement selecting method according to claim 10,
wherein said advertisement information selecting step selects the advertisement information to be exposed to said subscriber by inhibiting said selection priority of each of said individual advertisements in keeping with an increase of a quota attainment quotient obtained by dividing said results of said past exposure by an exposure count quota imposed on each of said individual advertisements.

18. An advertisement selecting method according to claim 10, wherein said selection priority of said advertisement information being determined based on an overall degree of matching for a system in an information-providing space involving parties made up of a content provider providing contents, a commercial sponsor offering advertisement information to be attached to said contents, and said subscriber.

19. A storage medium embodied on a computer readable medium which stores physically, in a computer-readable format, computer software for causing a computer system to select advertisement information for exposure to a subscriber, said computer software comprising the steps of:
a calculating step for calculating a selection priority (P) of each of said individual advertisements;
a managing step for managing results of past exposure by said subscriber to individual advertisements constituting said advertisement information and for calculating a past advertisement exposure count (C) of each individual advertisement;
a determining step for determining a degree of exposure inhibition (I), of each of said individual advertisements, derived from a predetermined inhibition coefficient (D) being raised to a power of the past advertisement exposure count of the advertisement ($I=D^C$), the degree of exposure inhibition (I) for an advertisement that has never been exposed is defined as 1, and a greater the past advertisement exposure count (C), a closer the degree of exposure inhibition (I) is to zero, the predetermined inhibition coefficient is adjusted based on matching conditions of (a) said subscriber, (b) a content provider and (c) a commercial sponsor of advertisements; and
a selecting step for obtaining a new selection priority for each advertisement information (AI), from among candidate advertisements, by multiplying said selection priority by said degree of exposure inhibition ($AI=P\times I$) and selecting the advertisement information having a highest new selection priority.

* * * * *